US011970901B2

(12) United States Patent
Luo et al.

(10) Patent No.: US 11,970,901 B2
(45) Date of Patent: Apr. 30, 2024

(54) WINDOW BLIND

(71) Applicant: Nien Made Enterprise Co., Ltd., Taichung (TW)

(72) Inventors: Lei Luo, Taichung (TW); Lin Chen, Taichung (TW)

(73) Assignee: NIEN MADE ENTERPRISE CO., LTD., Taichung (TW)

( * ) Notice: Subject to any disclaimer, the term of this patent is extended or adjusted under 35 U.S.C. 154(b) by 291 days.

(21) Appl. No.: 17/396,087

(22) Filed: Aug. 6, 2021

(65) Prior Publication Data

US 2022/0341255 A1 Oct. 27, 2022

(30) Foreign Application Priority Data

Apr. 21, 2021 (CN) ........................ 202120827143.5

(51) Int. Cl.
*E06B 9/305* (2006.01)
*E06B 9/322* (2006.01)
*E06B 9/323* (2006.01)

(52) U.S. Cl.
CPC .............. *E06B 9/305* (2013.01); *E06B 9/322* (2013.01); *E06B 9/323* (2013.01)

(58) Field of Classification Search
CPC .......... E06B 9/307; E06B 9/304; E06B 9/305; E06B 9/322; E06B 2009/3222; E06B 9/382; E06B 9/323
See application file for complete search history.

(56) References Cited

U.S. PATENT DOCUMENTS 5,927,365 A * 7/1999 Almodovar ............. E06B 9/362 160/168.1 V
5,934,351 A * 8/1999 Bharucha ................ E06B 9/307 160/176.1 R
8,910,696 B2 12/2014 Wen et al.
9,441,417 B2 * 9/2016 Shih ........................ E06B 9/262
9,988,838 B2 * 6/2018 Chen ........................ E06B 9/323
11,261,657 B1 * 3/2022 Wan ........................ E06B 9/322
2003/0085002 A1 * 5/2003 Palmer .................... E06B 9/322 160/168.1 R
2007/0125505 A1 * 6/2007 Liang ...................... E06B 9/322 160/170
2007/0272364 A1 * 11/2007 Liang ...................... E06B 9/322 160/84.05

(Continued)

*Primary Examiner* — Johnnie A. Shablack
*Assistant Examiner* — Matthew R. Shepherd
(74) *Attorney, Agent, or Firm* — Birch, Stewart, Kolasch & Birch, LLP

(57) ABSTRACT

A window blind has a headrail, a bottom rail, and multiple slats provided below the headrail. In the headrail, an adjusting shaft and an auxiliary adjusting module are provided and connected. A ladder string is connected to the adjusting shaft, whereby the adjusting shaft adjusts a shape of the ladder string to tilt the slats and the bottom rail. A first cord and a second cord extend out of the headrail and are connected to opposite sides of the bottom rail. When the adjusting shaft drives the slats to tilt in a direction, the auxiliary adjusting module releases the first cord out of the headrail and retracts the second cord into the headrail. When the slats are tilted in an opposite direction, the auxiliary adjusting module retracts the first cord into the headrail and releases the second cord out of the headrail.

11 Claims, 20 Drawing Sheets

(56) References Cited

U.S. PATENT DOCUMENTS

| | | | | |
|---|---|---|---|---|
| 2011/0315329 | A1* | 12/2011 | Hong | E06B 9/322<br>160/340 |
| 2014/0069592 | A1* | 3/2014 | Hsu | E06B 9/38<br>160/368.1 |
| 2014/0216664 | A1* | 8/2014 | Hsu | E06B 9/322<br>160/84.02 |
| 2014/0238622 | A1* | 8/2014 | Patterson | E06B 9/307<br>160/176.1 R |
| 2014/0262083 | A1* | 9/2014 | Chen | E06B 9/322<br>160/340 |
| 2014/0332170 | A1* | 11/2014 | Chang | E06B 9/262<br>160/84.02 |
| 2015/0259976 | A1* | 9/2015 | Hsueh-Cheng | A47H 1/04<br>160/368.1 |
| 2016/0053533 | A1* | 2/2016 | Chen | E06B 9/326<br>160/173 R |
| 2016/0208549 | A1* | 7/2016 | Chen | E06B 9/322 |
| 2017/0268290 | A1* | 9/2017 | Hsu | E06B 9/32 |
| 2018/0355661 | A1* | 12/2018 | Hummel | E06B 9/307 |
| 2019/0071925 | A1* | 3/2019 | Zhang | E06B 9/307 |

* cited by examiner

WINDOW BLIND

BACKGROUND OF THE DISCLOSURE

1. Field of the Disclosure

The present disclosure relates generally to a window blind, and more particularly to the window blind that could block out light more effectively.

2. Description of the Prior Art

As shown in FIG. 1, a conventional window blind 100 comprises a headrail 200, a plurality of slats 300, a bottom rail 400, a first cord 501, a second cord 502, a tilt wand 600, and a ladder string 601. The first cord 501 and the second cord 502 hang down from the headrail 200, and are used for retracting or releasing the slats 300 and the bottom rail 400. The ladder string 601 hangs down from the headrail 200 in a ladder-like shape and is capable of supporting the slats 300 and the bottom rail 400. When the tilt wand 600 drives the ladder string 601 to changes its shape, the slats 300 and the bottom rail 400 supported on the ladder string 601 may be tilted to different angles, whereby the amount of light (also the privacy or the visibility) passing through the window blind 100 can be adjusted.

When the window blind 100 is expanded (i.e., the slats 300 and the bottom rail 400 are released), a user can manipulate the tilt wand 600 to turn the slats 300 and the bottom rail 400 to a roughly horizontal position, which makes the slats 300 most separated from each other. At this time, the window blind 100 has the most visibility and can let in the most light in the horizontal direction. Conversely, to block out as much light as possible, the user can manipulate the tilt wand 600 to turn the slats 300 and the bottom rail 400 to a roughly vertical position to minimize the visibility and block out most of the light through the window blind 100. However, as shown in FIG. 1, the weight and the dimension of the bottom rail 400 would counteract the driving of the tilt wand 600 and distort the shape of the ladder string 601, especially at the lower part of the ladder string 601. No matter how hard the tilt wand 600 is turned, the outline of the ladder string 601 at most becomes a shape similar to a droplet, a triangle or a trapezoid. The slats 300 near the headrail 200 may abut each other along with the driving of the tilt wand 600. The lower slats 300 near the bottom rail 400 do not abut each other or cannot be fully closed. As a result, the visibility near the bottom rail 400 may not be minimized and some light can still pass through the part of the slats near the bottom rail 400.

SUMMARY OF THE DISCLOSURE

In light of the problems mentioned above, one aspect of the present disclosure is to provide a window blind that could effectively minimize the visibility or block out light when window blind is closed. When the disclosed window blind is closed, the slats near the bottom rail could be properly closed to minimize the visibility and the light passing through.

To achieve the above objective, the present disclosure provides an embodiment of a window blind, which comprises a headrail, a bottom rail, a plurality of slats, a ladder string, an adjusting shaft, a first cord, a second cord, and an auxiliary adjusting module. The slats are provided below the headrail. The ladder string extends out of the headrail, and comprises a first vertical portion, a second vertical portion, and a plurality of rungs for tilting the slats and the bottom rail. The adjusting shaft is provided in the headrail and connected to the first vertical portion and the second vertical portion for adjusting a shape of the ladder string to tilt the slats and the bottom rail. The first cord extends out of the headrail and is connected to a first side of the bottom rail, wherein the first cord located at first sides of the slats. The second cord extends out of the headrail and is connected to a second side of the bottom rail, wherein the second cord located at second sides of the slats. The auxiliary adjusting module is provided in the headrail and connected to the adjusting shaft. The auxiliary adjusting module interferes with the first cord and the second cord. When the first cord and the second cord are retracted, the slats and the bottom rail are received toward the headrail. When the first cord and the second cord are released, the slats and the bottom rail are expanded away from the headrail. When the adjusting shaft drives the slats to tilt toward a substantially vertical state in a first rotating direction, the auxiliary adjusting module releases the first cord out of the headrail and retracts the second cord into the headrail until each of the slats abuts an adjacent one of the slats. When the adjusting shaft drives the slats to turn from the substantially vertical state toward a substantially horizontal state in a second rotating direction opposite to the first rotating direction, the auxiliary adjusting module retracts the first cord into the headrail and releases the second cord out of the headrail.

In another embodiment, when the adjusting shaft tilts the slats to the substantially vertical state by releasing the first vertical portion out of the headrail and retracting the second vertical portion into the headrail, a length of the first cord released out of the headrail is greater than or equal to a length of the first vertical portion released out of the headrail, and a length of the second cord retracted into the headrail is greater than or equal to a length of the second vertical portion retracted into the headrail.

In another embodiment, the auxiliary adjusting module comprises a follower and a cord adjusting member connected to the follower. The follower is movable along with the adjusting shaft. The first cord and the second cord are movable along with the cord adjusting member. When the adjusting shaft is driven to turn the slats, the follower is driven by the adjusting shaft to move the cord adjusting member, which changes lengths of the first cord and the second cord respectively received in the head rail.

In another embodiment, when the slats are in the substantially horizontal state, the cord adjusting member is located at a first position. When the slats are in the substantially vertical state, the cord adjusting member is located at a second position. The first position is different from the second position.

In an embodiment, when the adjusting shaft drives the slats to turn from the substantially horizontal state to the substantially vertical state, a length of the first cord released out from the headrail or a length of the second cord retracted into the headrail is a multiple of a distance that the cord adjusting member moves from the first position to the second position.

In an embodiment, the auxiliary adjusting module further comprises a pushing member. The pushing member pushes against the cord adjusting member, and comprises an elastic member for providing an auxiliary pushing force to move the cord adjusting member toward the second position.

In an embodiment, the pushing member further comprises a swing arm and a moving member. The swing arm is pivotable relative to the cord adjusting member. The elastic member is provided between the swing arm and the moving member. An end of the moving member pushes against a force-bearing portion of the cord adjusting member. When the slats are in the substantially horizontal state, the force-bearing portion of the cord adjusting member located at the first position is closest to the swing arm, and the elastic member is compressed and has a first deformation length. When the slats are in the substantially vertical state, the force-bearing portion of the cord adjusting member located at the second position is farthest from the swing arm, and the elastic member is stretched and has a second deformation length. The second deformation length is greater than the first deformation length.

In another embodiment, the follower further comprises a bushing and a transmission member. The bushing fits over the adjusting shaft and rotates along with the adjusting shaft. Then transmission member connects the bushing and the cord adjusting member. When the bushing rotates along with the adjusting shaft, the transmission member drives the cord adjusting member to move. The transmission member comprises a transmission cord. An end of the transmission cord is fixedly connected to the bushing, and another end of the transmission cord is fixedly connected to the cord adjusting member.

In another embodiment, the cord adjusting member comprises a sliding seat. The first cord passes by a first end of the sliding seat, and the second cord passes by a second end of the sliding seat. The first end and the second end are on opposite sides of the sliding seat in a lateral direction of the headrail.

In another embodiment, the sliding seat further comprises a first sliding base, a second sliding base, and a linking cord connected between the first sliding base and the second sliding base. The first cord passes by the first sliding base, and the second cord passes by the second sliding base.

In another embodiment, the follower further comprises a bushing and a transmission member. The bushing fits over the adjusting shaft and rotates along with the adjusting shaft. The transmission member comprises a first transmission cord and a second transmission cord. The cord adjusting member comprises a first sliding base and a second sliding base which are movable. The first transmission cord is movable along with the first sliding base, and an end of the first transmission cord is fixedly connected to the bushing. The second transmission cord is movable along with the second sliding base, and an end of the second transmission cord is fixedly connected to the bushing. The first cord passes by the first sliding base, and the second cord passes by the second sliding base.

In another embodiment, the window blind further comprises two tilting units, wherein the auxiliary adjusting module is located between the tilting units. The auxiliary adjusting module further comprises a first direction-changing member provided corresponding to the first sliding base, and a second direction-changing member provided corresponding to the second sliding base. The first cord contacts and veers at the first direction-changing member and passes by the first sliding base. The second cord contacts and veers at the second direction-changing member and passes by the second sliding base.

In another embodiment, the window blind further comprises a tilting unit, wherein the tilting unit comprises a drum fitting over the adjusting shaft; the drum rotates along with the adjusting shaft. An end of the ladder string is connected to the drum. A diameter of the bushing is greater than or equal to half of a diameter of the drum.

According to the descriptions above, the window blind disclosed in the present disclosure could effectively block out light when the window blind is closed. Moreover, the user may easily and precisely operates the tilt wand to close the window blind.

BRIEF DESCRIPTION OF THE DRAWINGS

The present disclosure will be best understood by referring to the following detailed description of some illustrative embodiments in conjunction with the accompanying drawings, in which.

DETAILED DESCRIPTION

Figure 9:
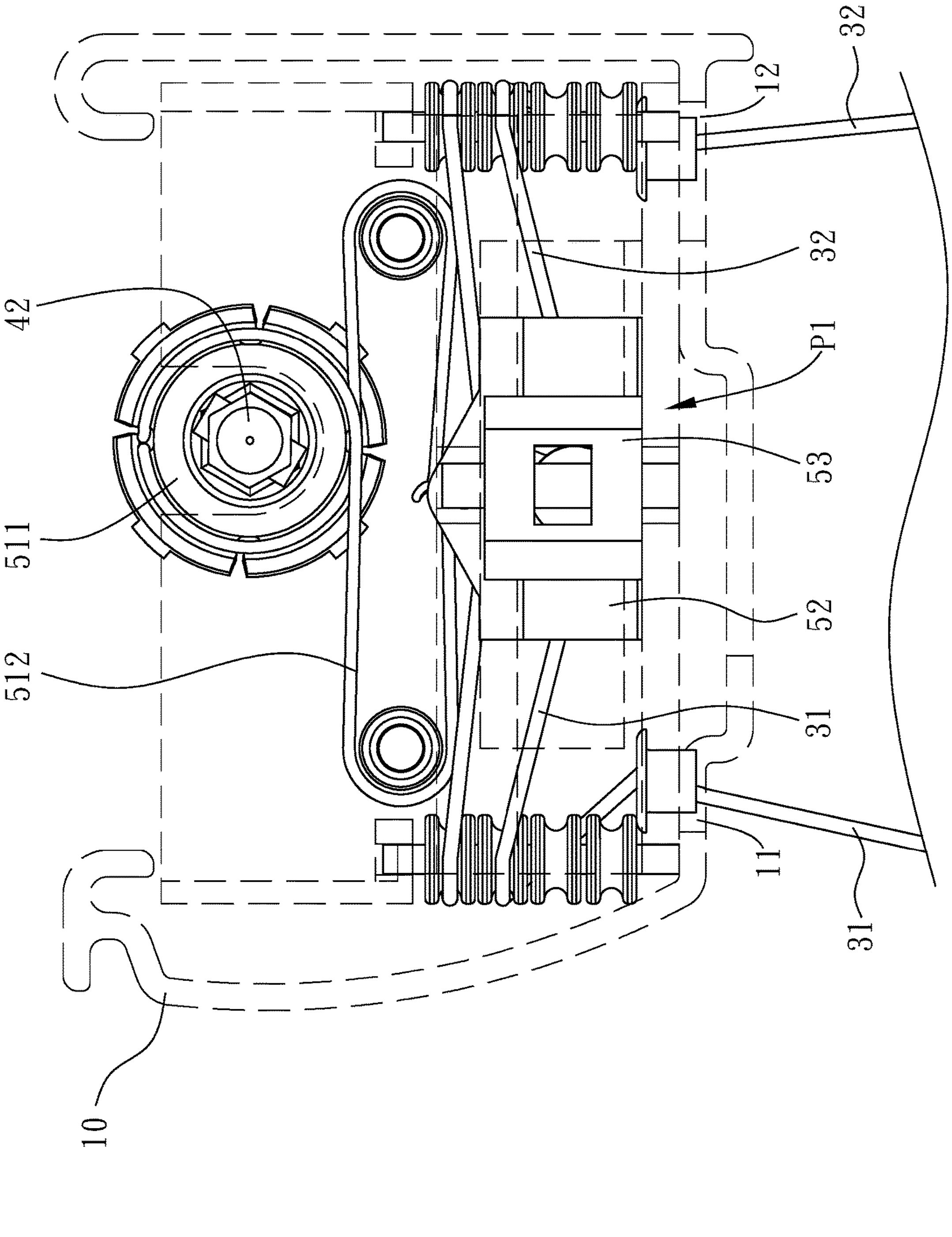
FIG. 9 is a side view of the first embodiment of the auxiliary adjusting module in the headrail when the window blind is in the open state as shown in FIGS. 2-3.

In order to explain the present disclosure more clearly, the embodiments are described in detail with the accompanying drawings as follows. As shown in FIGS. 2-6 and FIG. 9, according to an example embodiment of the present disclosure, a window blind 1 comprises a headrail 10, a plurality of slats 20, a bottom rail 21, a lifting module 30, a tilting module 40, and an auxiliary adjusting module 50. In the figures, the headrail 10 comprises a case extending horizontally. The slats 20 are sequentially arranged beneath the headrail 10, and the bottom rail 21 is located below the bottommost slat 20. The lifting module 30 comprises a first cord 31, a second cord 32, and an actuation unit 33 which is configured to receive or release the cords 31 and 32. As shown in FIG. 9, a first through hole 11 and a second through hole 12 are provided on a bottom of the headrail 10. The first through hole 11 and the second through hole 12 are respectively located on different ends across a longitudinal axis of the headrail 10. The longitudinal axis of the headrail 10 is a virtual axis extending in the longitudinal direction of the headrail 10, and equally divides the headrail 10. The first cord 31 has two ends respectively connected to the actuation unit 33 and the bottom rail 21. Between the two ends, the first cord 31 sequentially passes through the auxiliary adjusting module 50, the first through hole 11, and the first sides (the front sides in the figures) of the slats 20. Similarly, the second cord 32 has two ends respectively connected to the actuation unit 33 and the bottom rail 21. Between the two ends, the second cord 32 sequentially passes through the auxiliary adjusting module 50, the second through hole 12, and the second sides (the back sides in the figures) of the multiple slats 20. In the current embodiment, the two through holes 11 and 12 are two separated outlets so that the first cord 31 and the second cord 32 could pass through the headrail 10 at expected positions. However, the through holes may also be realized with other suitable approaches. In other embodiments, an elongated hole extending through the bottom of the headrail 10 could be provided, and the first cord 31 and the second cord 32 both pass through the single elongated hole and extend out of the headrail 10. In such an embodiment, the first through hole 11 is a part of the elongated hole of the headrail 10 where the first cord 31 passes through, and the second through hole 12 is another part of the elongated hole where the second cord 32 passes through. In the current embodiment, the bottom rail 21 is heavier than any one of the slats 20. For example, the weight of the bottom rail 21 could be modified by changing the material, the thickness, or the volume of the bottom rail 21. In other embodiment, additional weight(s) may also be attached to the bottom rail 21. The first cord 31 and the second cord 32 connected to the bottom rail 21 would be taut due to the weight of the bottom rail 21. The actuation unit 33 can be realized with any suitable mechanism capable of applying an actuation force to the first and second cords 31 and 32. The actuation force could be generated manually or electrically, such as a force exerted through an exposed control cord, an electric motor, and a spring motor. In the current embodiment, the actuation unit 33 is a spring-driven cord retractor. By pulling down the bottom rail 21, the first and second cords 31 and 32 would be released from the spring-driven cord retractor, and the spring inside the spring-driven cord retractor would be distorted to accumulate energy during the process. By pushing up the bottom rail 21, the spring inside the spring-driven cord retractor would release the accumulated energy to retract the first and second cords 31 and 32 back into the spring-driven cord retractor. The design and structure of the spring-driven cord retractor are well known, and therefore will not be described in detail herein. In the current embodiment, the actuation unit 33 is provided in the headrail 10. However, this is not a limitation of the present invention. In other embodiments, the actuation unit 33 can be also provided in the bottom rail 21 or other suitable location. When the first and second cords 31, 32 are being released from the actuation unit 33, the slats 20 and the bottom rail 21 move in a releasing direction away from the headrail 10, whereby to expand the window blind 1. When the slats 20 and the bottom rail 21 are in the condition shown in FIGS. 2-3 (e.g., the bottom rail 21 reaches the lowermost position), the slats 20 and the window blind 1 are fully expanded. When the first and second cords 31, 32 are being retracted into the actuation unit 33, the slats 20 and the bottom rail 21 move in a retracting direction toward the headrail 10 and gradually stack on each other, whereby to retract the window blind 1.

Figure 4:
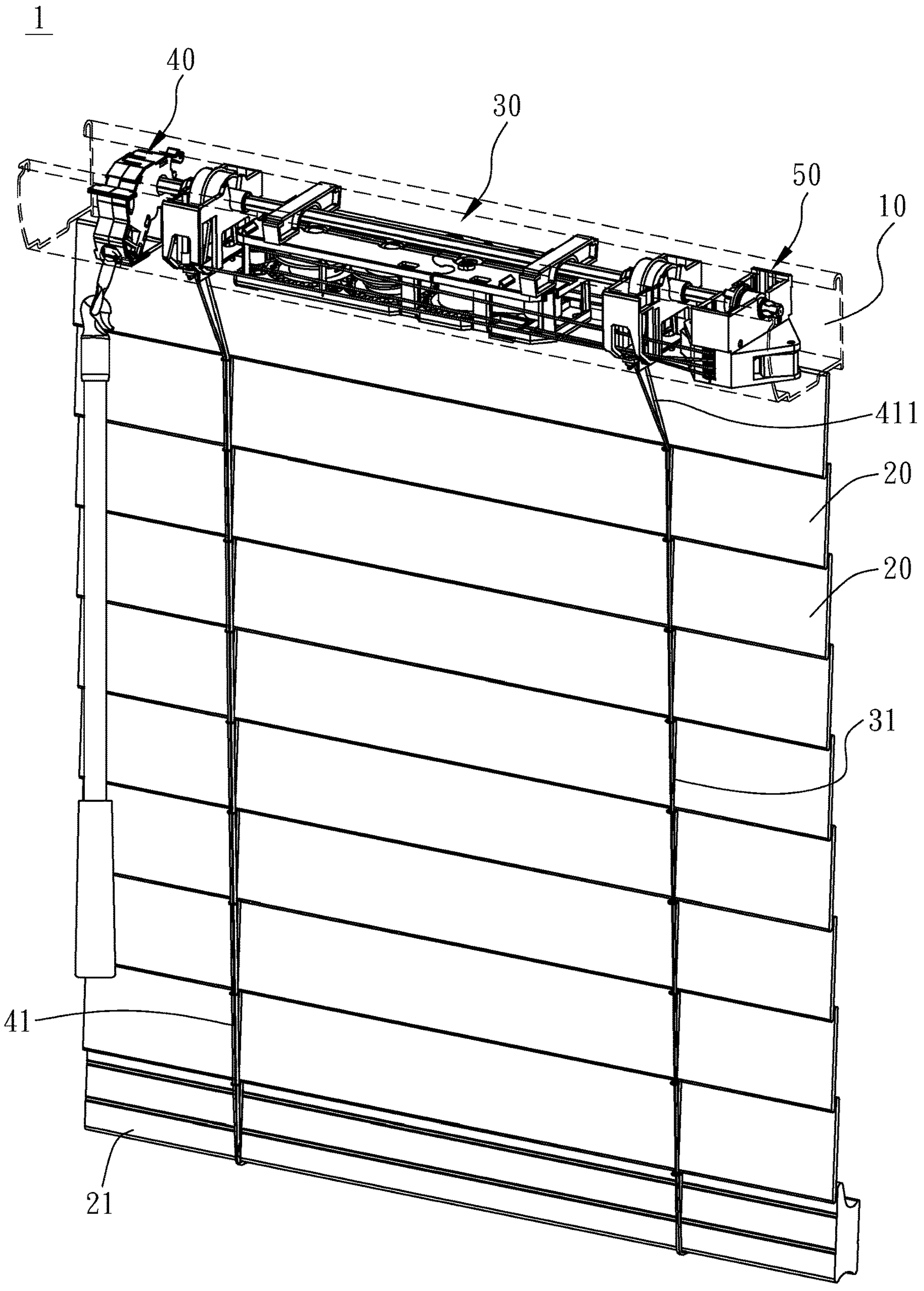
FIG. 4 is a perspective view showing the window blind of the present disclosure when it is in the closed state.

As shown in FIG. 4, the tilting module 40 comprises two ladder strings 41, an adjusting shaft 42, a driving unit 43, and two tilting units 44. The adjusting shaft 42 is located in the headrail 10, and extends in the longitudinal direction of the headrail 10. In the current embodiment, the adjusting shaft 42 sequentially passes through the driving unit 43, two tilting units 44, and the auxiliary adjusting module 50. The driving unit 43 could be manipulated by a manual or electrically generated external force to drive the adjusting shaft 42 to rotate. For example, in the figures, the driving unit 43 is connected between a tilt wand and the adjusting shaft 42 for transmitting the manual force received through the tilt wand to the adjusting shaft 42. The techniques regarding the mechanism of the driving unit 43 are well known, and therefore will not be described in detail herein. Examples of the driving unit and the tilting module may be found in U.S. Pat. No. 8,910,696B2, the entirety of which is hereby incorporated by reference. Each of the tilting units 44 comprises a drum 441 fitting over the adjusting shaft 42. The drum 441 of each of the tilting units 44 may be driven by the adjusting shaft 42 and rotate along with the adjusting shaft 42. The two ladder strings 41 are suitably spaced along the longitudinal direction of the headrail 10, e.g., respectively configured near the left side and the right side of the window blind 1 in the figures. Each of the ladder strings 41 comprises a first vertical portion 411, a second vertical portion 412, and a plurality of rungs. When the slats 20 are fully expanded and the bottom rail 21 is at the lowermost position, the first vertical portion 411 and the second vertical portion 412 are substantially vertical and suitably spaced apart (e.g., substantially parallel to each other when the window blind 1 in the open state). Two ends of each of rungs are respectively connected to the first vertical portion 411 and the second vertical portion 412, and the rungs are suitably spaced apart for supporting the slats 20. Each of the ladder strings 41 is connected to one of the tilting units 44. Specifically, for each of the ladder strings 41, a top end of the first vertical portion 411 and a top end of the second vertical portion 412 respectively pass two opposite sides of the corresponding tilting unit 44, and are connected to the drum 441 of the corresponding tilting unit 44. The first vertical portion 411 and the second vertical portion 412 extend out of the headrail 10, and the lower ends of the first vertical portion 411 and the second vertical portion 41 are both connected to the bottom rail 21. The slats 20 are placed on and supported by the rungs of the ladder strings 41. In the current embodiment, for the ladder string 41 shown on the right side of FIG. 6, the first vertical portion 411 extends out of the headrail 10 through the first through hole 11, as the first cord 31 does, and the second vertical portion 412 extends out of the headrail 10 through the second through hole 12, as the second cord 32 does. The other ladder string 41 on the left side may have a similar arrangement. For example, on the left side of FIG. 6, the headrail 10 may also be provided with two through holes, each of which is also passed by one of the vertical portions 411 and 412 of the ladder string 41. By providing the first and second cords 31, 32 and one of the ladder strings 41 together, the cords 31, 32 could be as close to the vertical portions 411 and 422 as possible. In this way, when one sees the front of the window blind 1, it could give a visual impression that there are fewer strings (i.e., cords and vertical portions) than there actually are, which would improve the aesthetics of the window blind 1. Moreover, the headrail 10 would only require limited numbers of through holes bored thereon, which would benefit the manufacturing procedures and could maintain the strength of the headrail 10. However, in other embodiments, the first and second vertical portions 411 and 412 of one of the ladder strings 41 could also be configured to pass through different through holes on the headrail 10. The operation and effect of the mechanisms of the present disclosure would not be affected.

Figure 1:
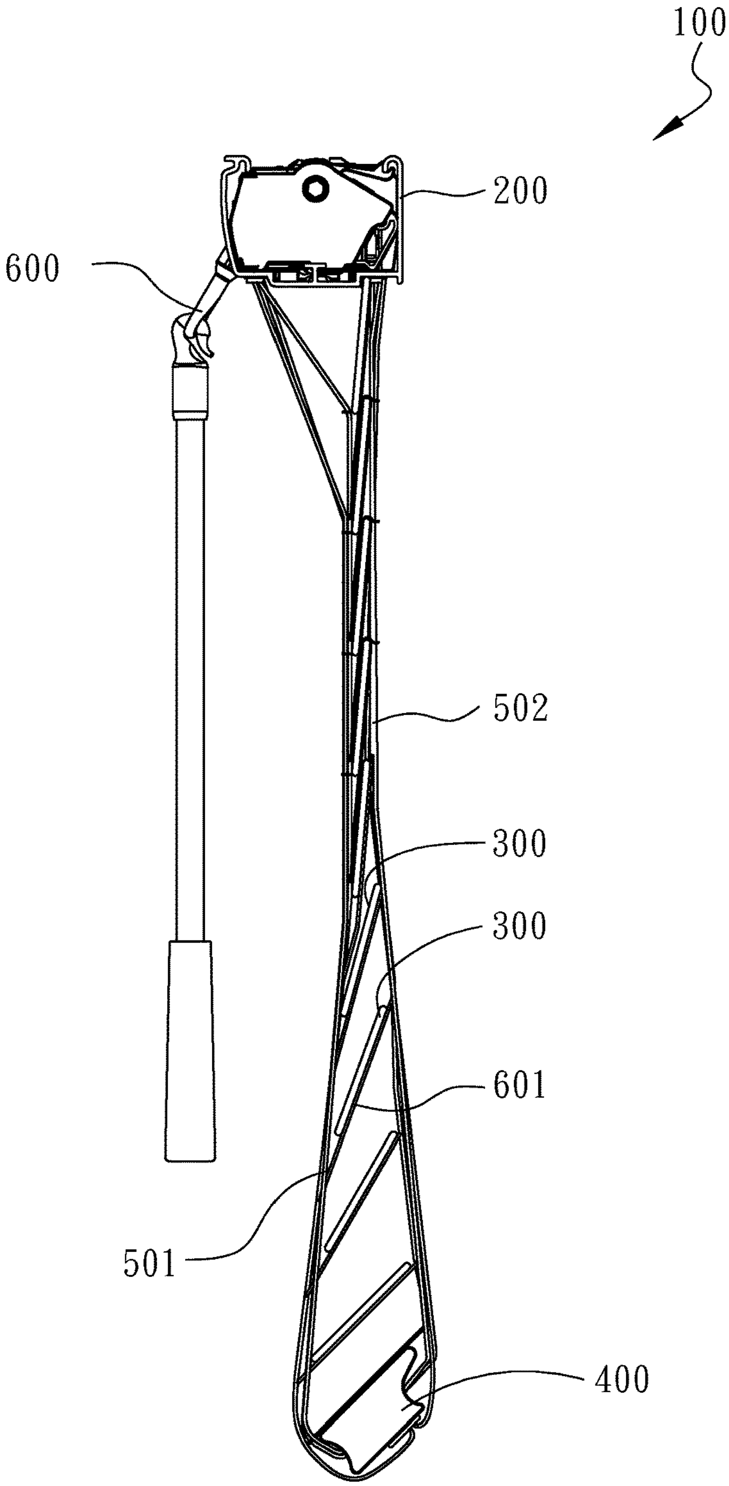
FIG. 1 (Prior Art)
FIG. 1 is a side view of a conventional window blind turned to the closed state.
Figure 2:
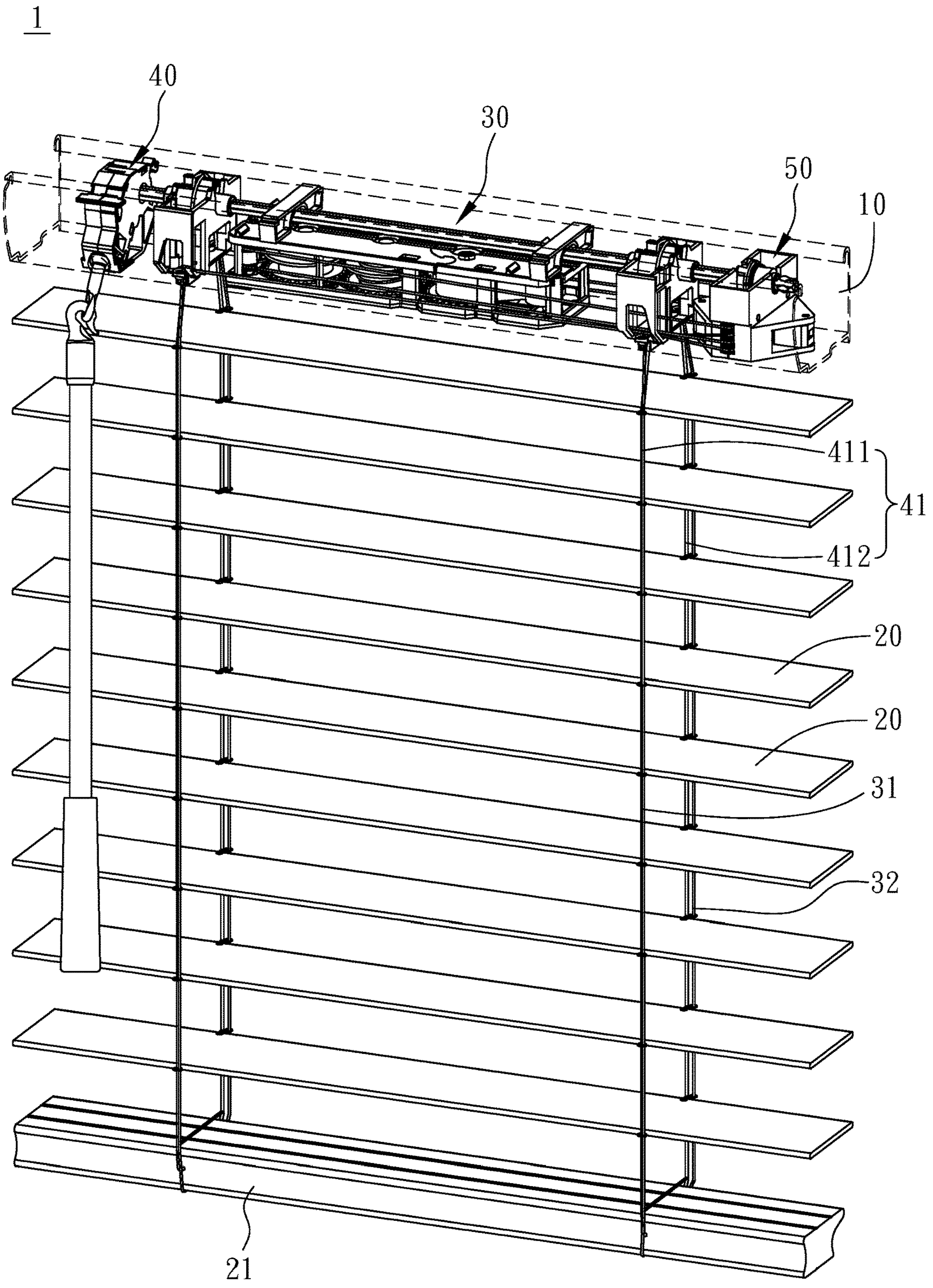
FIG. 2 is a perspective view showing a window blind of the present disclosure in the open state.
Figure 3:
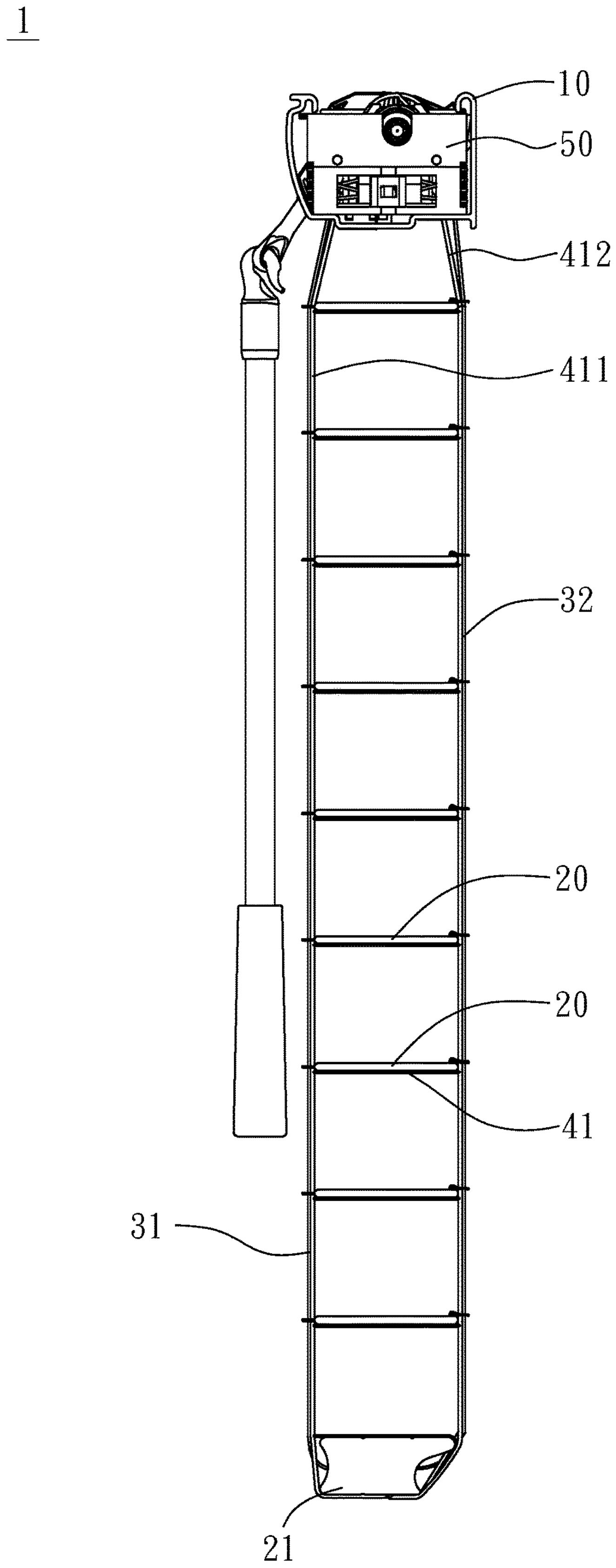
FIG. 3 is a side view of the window blind in FIG. 2.
Figure 5:
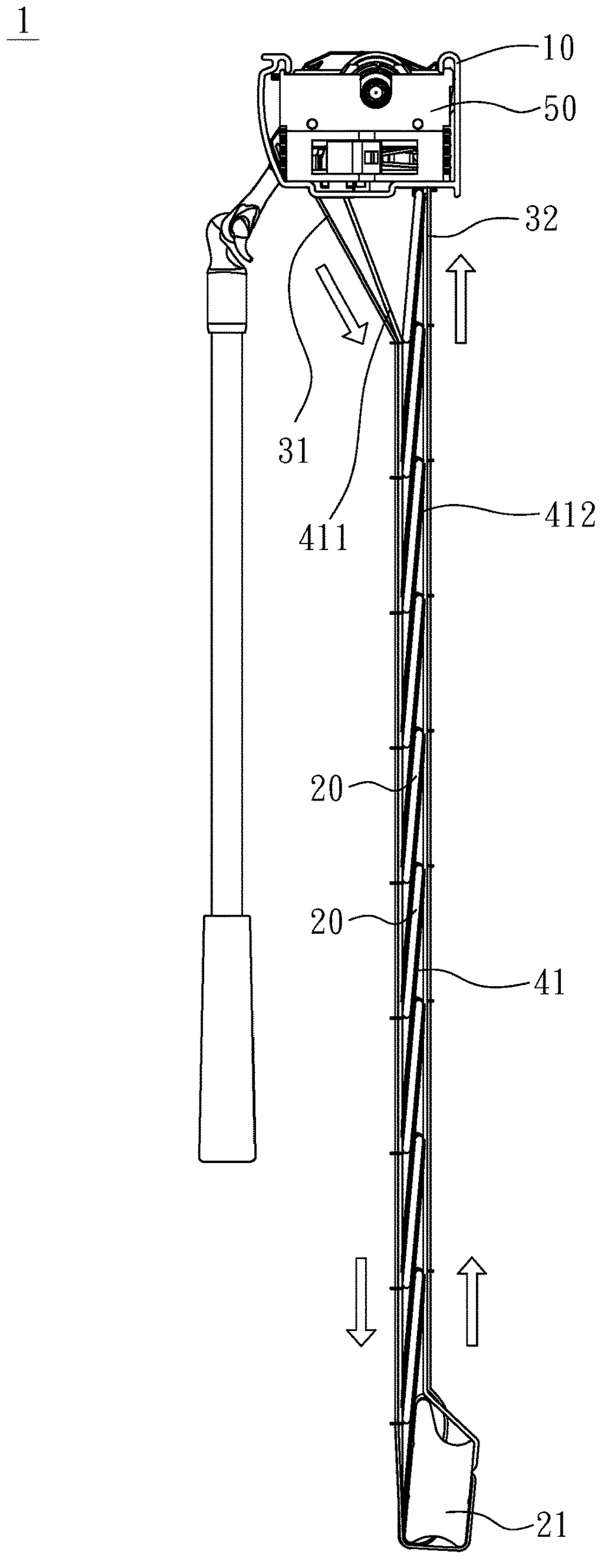
FIG. 5 is a side view of the window blind in FIG. 4.

When the driving unit 43 drives the adjusting shaft 42 to rotate, the tilting units 44 would be correspondingly rotated along with the adjusting shaft 42. By rotating the drums 441 of the tilting units 44, one of the first vertical portion 411 and the second vertical portion 412 of each of the ladder strings 41 would be released, and the other one of the first vertical portion 411 and the second vertical portion 412 would be retracted. Accordingly, the first vertical portion 411 and the second vertical portion 412 of each of the ladder strings 41 would respectively move in different vertical directions. For example, when the adjusting shaft 42 and the drum 441 of the tilting unit 44 are driven to turn in a first rotating direction, the first vertical portions 411 of the ladder strings 41 are released in a releasing direction out of the headrail 10, and the second vertical portions 412 of the ladder strings 41 are retracted in a retracting direction into the headrail 10. When the adjusting shaft 42 and the drum 441 of the tilting unit 44 are driven to turn in a second rotating direction, the first vertical portions 411 of the ladder strings 41 are retracted in the retracted direction into the headrail 10, and the second vertical portions 412 of the ladder strings 41 are released in the releasing direction out of the headrail 10. As a result, for each of the ladder strings 41, the shape of the ladder strings 41 would be changed and the multiple rungs connecting the first vertical portion 411 and the second vertical portion 412 would tilt, whereby to turn the slats 20 placed on the rungs by a tilt angle. For ease of interpretation, when the slats 20 and the bottom rail 21 are turned into an arrangement that a light-blocking surface of each of the slats 20 is substantially horizontal and the slats 20 are most separated from each other, the window blind 1 is defined to be in the open state which lets in the most light in the horizontal direction (or has the most visibility in the horizontal direction), as shown in FIGS. 2-3. When the slats 20 and the bottom rail 21 are turned into another arrangement that each of the slats 20 is substantially vertical and abut against the adjacent one of the slats 20, the window blind 1 is defined to be in a closed state which blocks out the most light, as shown in FIGS. 4-5. As shown in FIGS. 4-5, an end on a first side (e.g., the front longer side in FIG. 4) of each of the slats 20 is adjacent to and abuts against an end on a second side (e.g., the rear longer side in FIG. 4) of the adjacent one of the slats 20. The slats adjacent to the headrail 10 or the bottom rail 21 may be respectively configured to abut against the headrail 10 or the bottom rail 21 accordingly.

Figure 6:
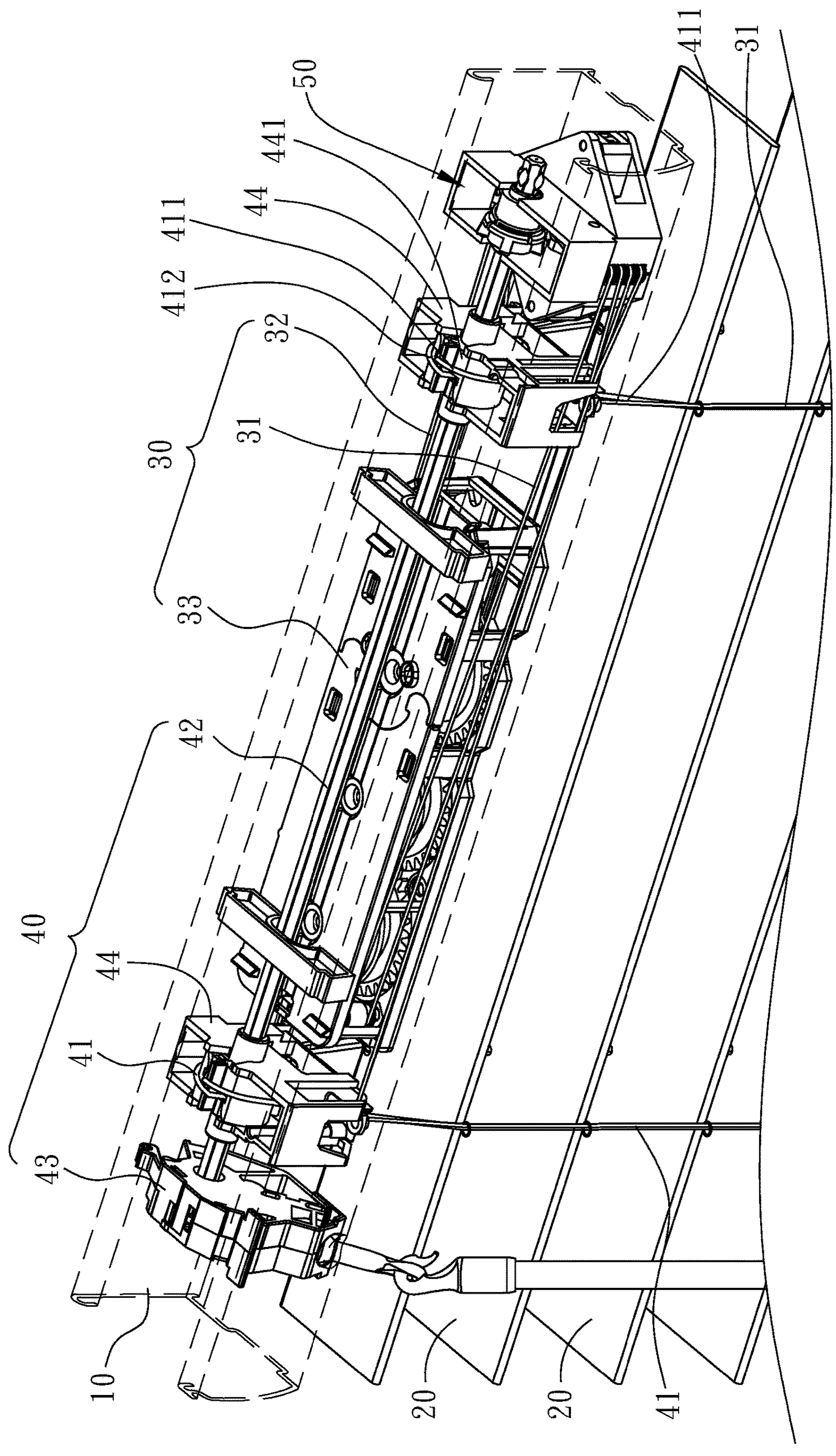
FIG. 6 is a perspective view showing a simplified example configuration inside the headrail of the window blind of the present disclosure.
Figure 7:
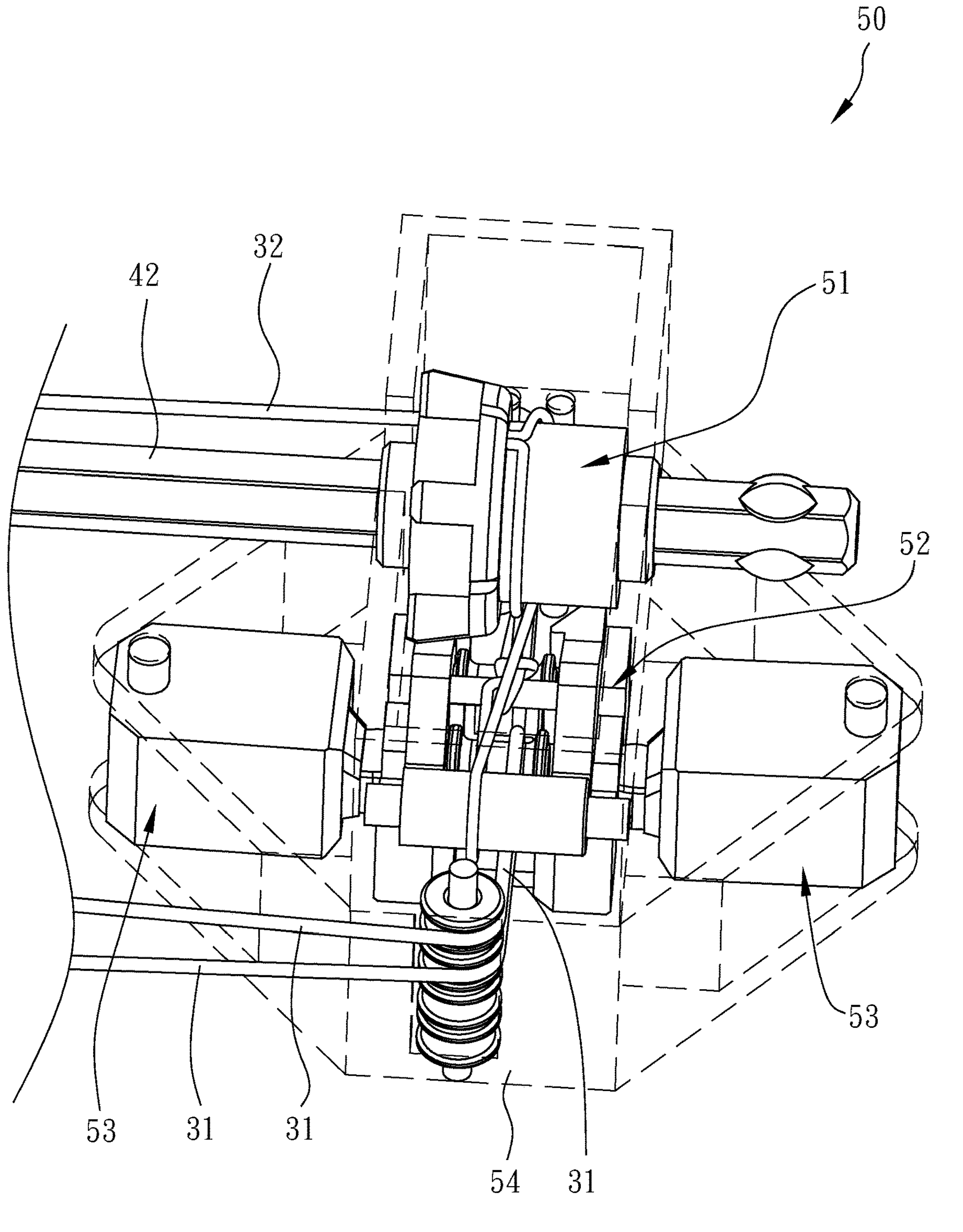
FIG. 7 is a perspective view of a first embodiment of the auxiliary adjusting module.
Figure 8:
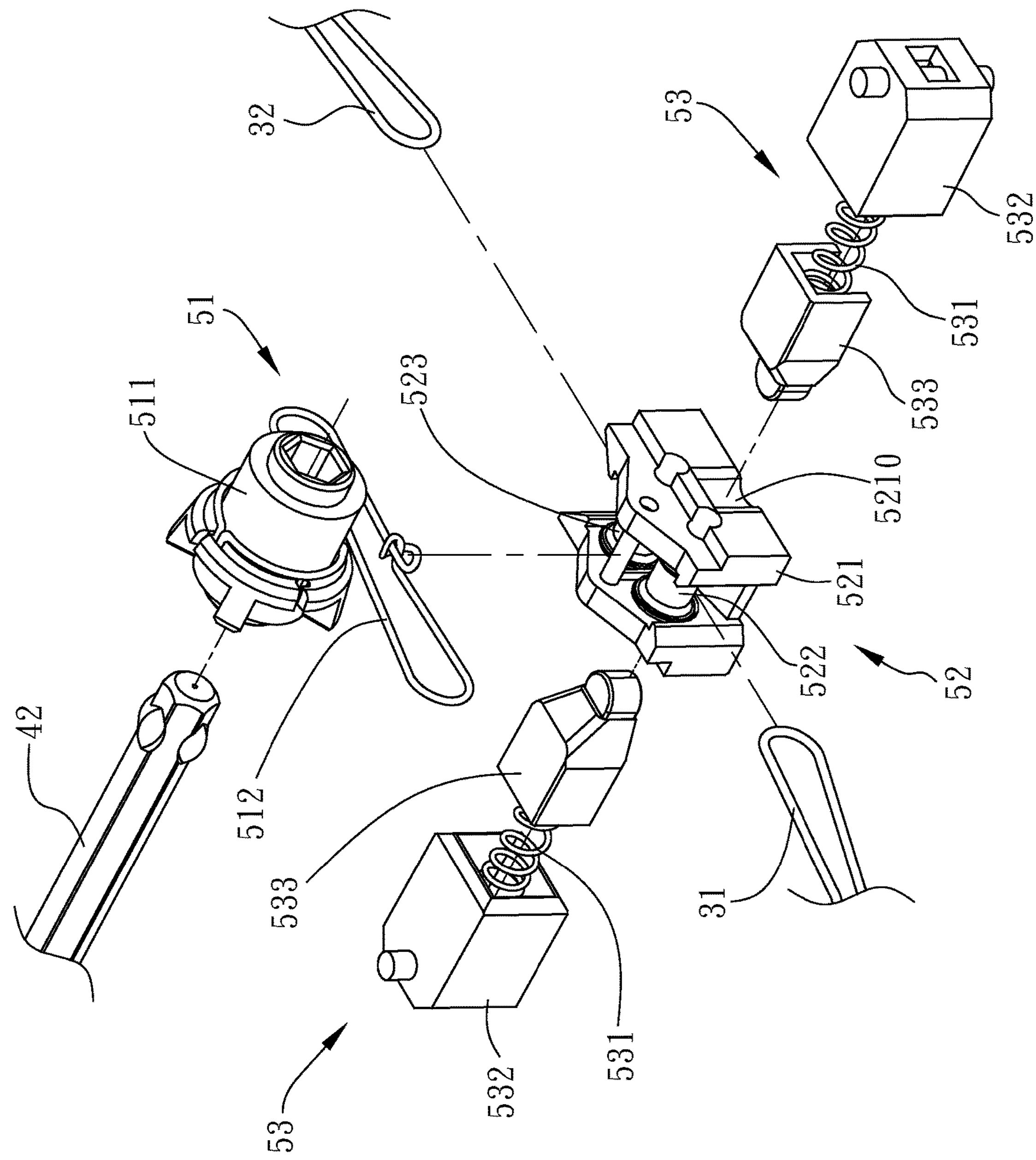
FIG. 8 is an exploded view of the first embodiment of the auxiliary adjusting module with the case omitted.
Figure 11:
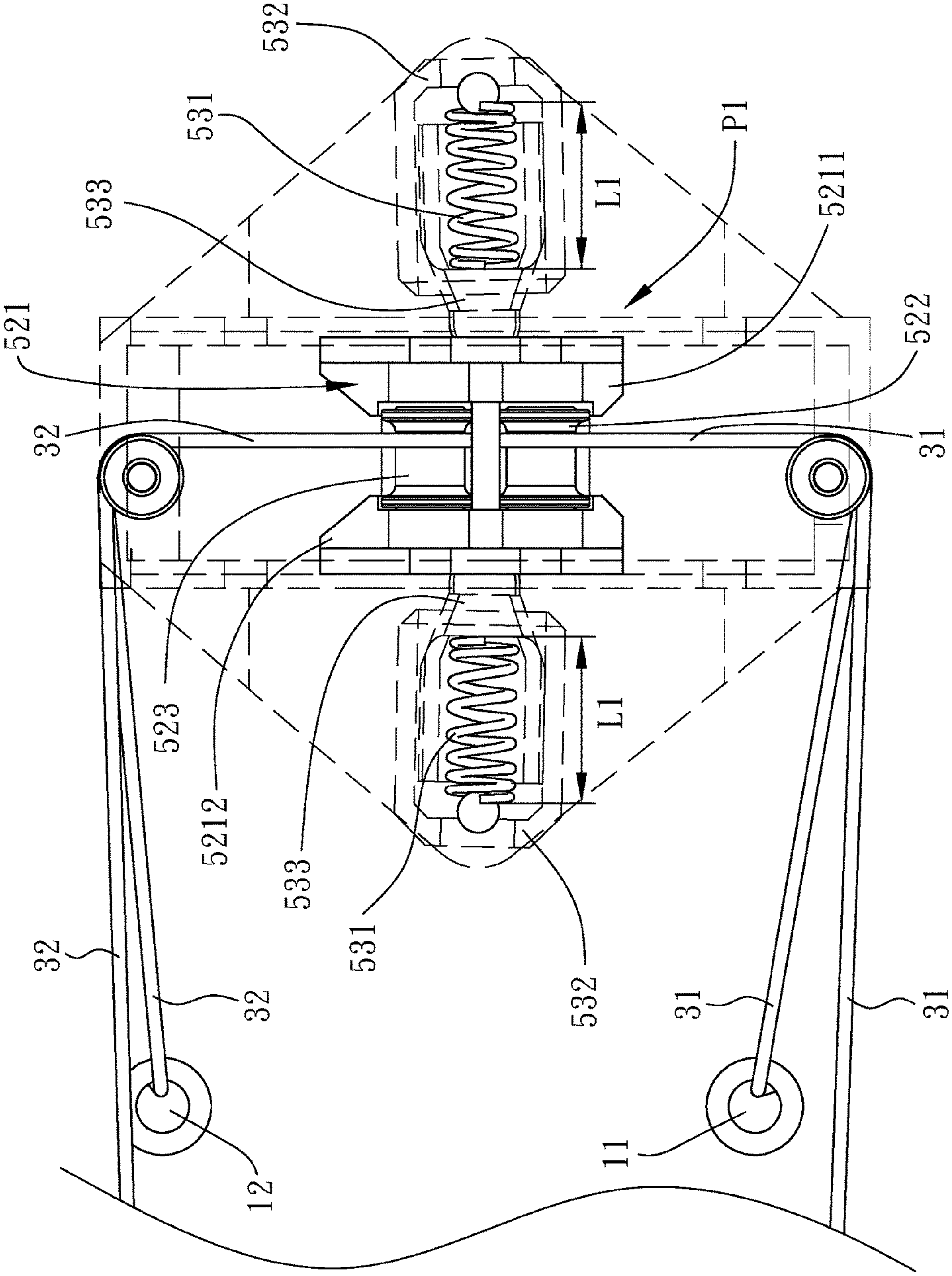
FIG. 11 is a top view of the auxiliary adjusting module in FIG. 9 showing the positions of the cord adjusting member and the pushing member of the auxiliary adjusting module and their interactions with the cords when the window blind is in the open state.

There are two pairs of the first cord 31 and the second cord 32 respectively on the right side and the left side of the window blind 1. For ease of interpretation, the first and second cords 31 and 32 on the right side of the window blind 1 will be used to explain the following embodiments. The first and second cords 31 and 32 on the left side of the window blind have similar structure and may operates in the same or similar manner. As shown in FIG. 6, the auxiliary adjusting module 50 is connected to the first cord 31 and the second cord 32 of the lifting module 30, and is also connected to the adjusting shaft 42 of the tilting module 40. In the current embodiment, the auxiliary adjusting module 50 is provided in the vicinity of the tilting unit 44, and near an end of the headrail 10 which is opposite to the driving unit 43 along the longitudinal direction of the headrail 10. As shown in FIG. 7, the auxiliary adjusting module 50 comprises a follower 51, a cord adjusting member 52, two pushing members 53, and a case 54 for accommodating all the above components. The case 54 in FIG. 7 is depicted by dotted lines so that the relative positions of the components accommodated therein can be shown. As shown in FIG. 8, the follower 51 comprises a bushing 511 and a transmission member 512. The bushing 511 fits over the adjusting shaft 42. An outline of an inner surface of the bushing 511 matches an outer surface of the adjusting shaft 42, and therefore the bushing 511 could rotate along with the adjusting shaft 42. In the current embodiment, the transmission member 512 comprises two transmission cords. Each of the transmission cords has two ends fixedly connected to the bushing 511 and the cord adjusting member 52, respectively. The rotating motion of the bushing 511 would drive the transmission member 512 to pull and move the cord adjusting member 52, whereby the rotating motion of the bushing 511 would cause the transmission member 512 to perform a linear motion. However, the transmission member 512 may be not limited to comprise two transmission cords. Any mechanism capable of converting rotary motion into linear motion, such as the combination of a toothed rack and a pinion, can be used to realize the transmission member 512 in other embodiments. The cord adjusting member 52 is substantially a block, which moves back and forth in the case 54 in a lateral direction of the headrail 10. The cord adjusting member 52 comprises a sliding seat 521 and two rods 522 and 523. As shown in FIG. 11, the rod 522 is horizontally located at a first end 5211 of the sliding seat 521, and the rod 523 is horizontally located at a second end 5212 of the sliding seat 521, wherein the first end 5211 and the second end 5212 are on opposite sides of the sliding seat 521. In the current embodiment, the first end 5211 and the second end 5212 are arranged substantially in the lateral direction of the headrail 10. The sliding seat 521 has two force-bearing portions 5210, which are provided on opposite sides of the sliding seat 521 substantially in the longitudinal direction of the headrail 10. In this embodiment, the rods 522 and 523 are aligned in a direction substantially perpendicular to a direction in which the force-bearing portions 5210 are aligned. The transmission member 512 is fixedly connected to the cord adjusting member 52 at a central top of the sliding seat 521. After horizontally extending out of the actuation unit 33, the first cord 31 changes its routing direction at least by contacting and veering at the rod 522 of the sliding seat 521, and then leaves the headrail 10 downwards through the first through hole 11. After horizontal extending out of the actuation unit 33, the second cord 32 changes its routing direction at least by contacting and veering at the rod 523 of the sliding seat 521, and then leaves the headrail 10 downwards through the second through hole 12. The pushing members 53 are respectively provided on two sides of the case 54 for respectively engaging with the force-bearing portions 5210 of the sliding seat 521. Each of the pushing members 53 comprises an elastic member 531, a swing arm 532, and a moving member 533. In the current embodiment, the elastic member 531 comprises a compression spring. Two ends of the compression spring respectively abut against the swing arm 532 and the moving member 533. The swing arm 532 is pivotally provided at the case 54 through a pivot. The moving member 533 is configured in a manner that it can be swung along with the swing arm 532. For example, one of the ends of the moving member 533 can be inserted into the swing arm 532. The moving member 533 can be moved toward or away from the swing arm 532 due to the driving of the elastic member 531. Each of the moving members 533 has an end away from the swing arm 532. Due to the elastic effect of the elastic members 531, each of the moving members 533 would press against the sliding seat 521. Specifically, the moving members 533 would respectively press against the sliding seat 521 at the force-bearing portions 5210 on the corresponding sides.

The operation of the auxiliary adjusting module 50 is explained accompanied with FIGS. 9-12, which takes place while the slats 20 of the window blind 1 are being tilted in a first rotating direction. When the window blind 1 is in the open state which lets in the most light in the horizontal direction (i.e., when the slats 20 are substantially horizontal and are most separated from each other), the cord adjusting member 52 of the auxiliary adjusting module 50 would be located at a first position P1 near the middle of the case 54 (in the lateral direction of the headrail 10). At this time, the pushing members 53 are located at positions substantially facing each other, as shown in FIG. 11. Meanwhile, for each of the pushing members 53, the elastic member 531 between the swing arm 532 and the moving member 533 is compressed and has a first length LL I.e., a force which each of the elastic members 531 exerts on the sliding seat 521 through the engaged moving member 533 is substantially perpendicular to the sliding seat 521, and the forces of the elastic members 531 do not exert on the sliding seat 521 in the lateral direction of the headrail 10.

Figure 10:
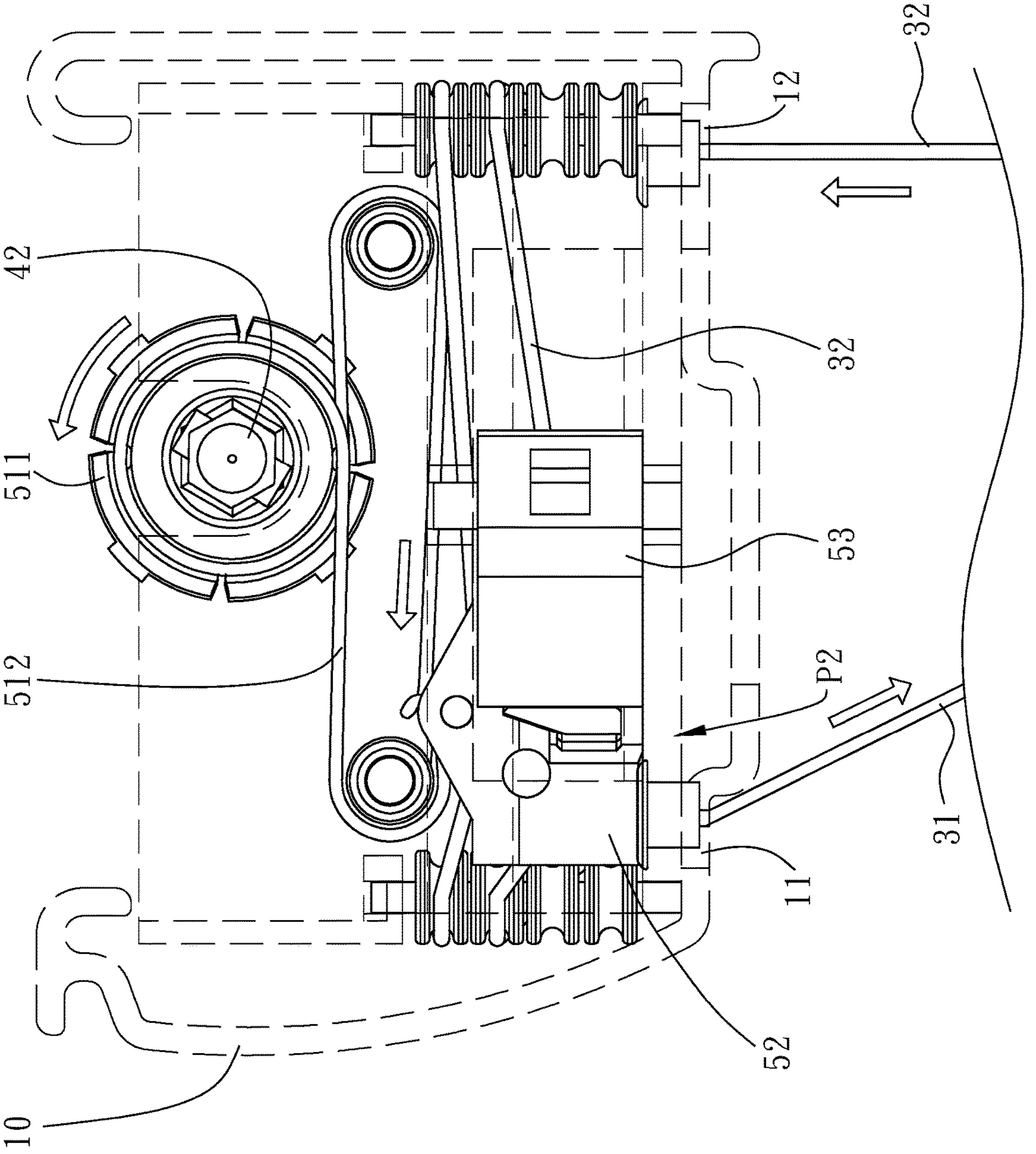
FIG. 10 is a side view of the first embodiment of the auxiliary adjusting module in the headrail when the window blind is in the closed state as shown in FIGS. 4-5.

To change the window blind 1 into the closed state which blocks out the most light (i.e., the state that the end on the first side of each of the slats 20 abuts against the end on the second side of the adjacent one of the slats 20, as shown in FIGS. 5-6), one should manipulate the driving unit 43 to rotate the adjusting shaft 42, whereby to drive and rotate the drums 441 of the tilting units 44. In this embodiment, for each of the ladder strings 41, the first vertical portion 411 would be released downward, the second vertical portion 412 would be retracted upward, and the multiple rungs would therefore be tilted. As shown in FIG. 5, left ends of the rungs of the ladder strings 41 are substantially lower than right ends of the rungs of the ladder strings 41. As shown in FIG. 4, in the closed state, the front ends of the rungs of each of the ladder strings 41 in front of the slats 20 are substantially lower than the rear ends of the rungs of the ladder strings 41 behind the slats 20. Consequently, the bottom rail 21 and the slats 20 placed on the rungs connected to the first and second vertical portions 411 and 412 would be also in a tilted state that their left side is lower than their right side, as shown in FIG. 5. FIGS. 9-10 illustrate the operation of the auxiliary adjusting module 50 while the driving unit 43 is being manipulated to rotate the adjusting shaft 42. During the process, the bushing 511 of the follower 51 would be driven by the adjusting shaft 42 to rotate along with the adjusting shaft 42, and the rotation of the bushing 511 would actuate the transmission member 512, driving the cord adjusting member 52 which is fixedly connected to the transmission member 512 to leave the first position P1. In more detail, since the transmission member 512 contacts and veers along an outer surface of the bushing 511, different parts of the transmission member 512 would be respectively retracted or released relative to the cord adjusting member 52 when the bushing 511 rotates. Furthermore, the first cord 31 and the second cord 32 respectively contact and veer at the rods 522 and 523 at the first and second ends 5211 and 5212 of the cord adjusting member 52. With such arrangement, the cord adjusting member 52 is constantly influenced at least by the weight of the bottom rail 21 and the pulling force of the actuation unit 33. Therefore, there would always be forces exerted on the cord adjusting member 52 in the lateral direction of the headrail 10 so that the cord adjusting member 52 would move in the case 54 in the lateral direction of the headrail 10 along with the relative retraction or release of the transmission member 512.

Figure 12:
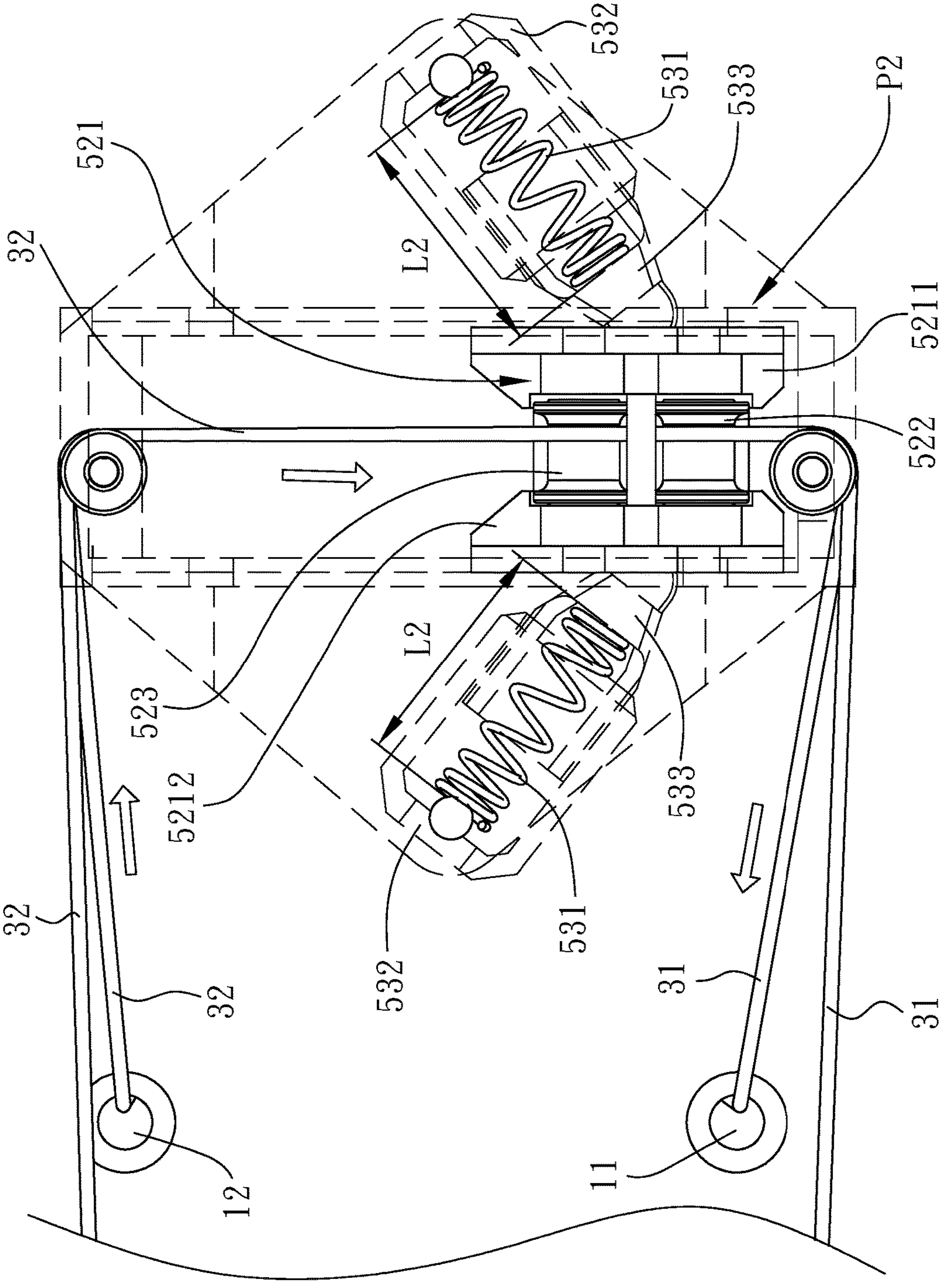
FIG. 12 is a top view of the auxiliary adjusting module in FIG. 10 showing the positions of the cord adjusting member and the pushing member of the auxiliary adjusting module and their interactions with the cords when the window blind is in the closed state.

In the current embodiment, the transmission member 512 comprises two transmission cords. Each of the transmission cords respectively contacts and veers along the outer surface of the bushing 511 on one of two opposite sides of the bushing 511, changes its direction by making one or more turns at one or more pins, and then is fixedly connected to the bushing 511 with an end thereof. Another end of each of the transmission cords is fixedly connected to the cord adjusting member 52, respectively, as shown in FIG. 9. When the bushing 511 is driven to rotate by the adjusting shaft 42, from the perspective of the cord adjusting member 52, one of the transmission cords would be released from the bushing 511, and the other one of the transmission cords would be retracted by the bushing 511. In this way, the rotating motion of the bushing 511 could be converted to the linear motion of the cord adjusting member 52 more steadily and effectively. At the same time, due to the movement of the cord adjusting member 52, the pushing members 53 pushing against the force-bearing portions 5210 of the cord adjusting member 52 would be also driven to swing by the cord adjusting member 52, and would therefore deviate from their original positions where the pushing members 53 are substantially aligned with each other. When the cord adjusting member 52 is located at the first position P1, the elastic member 531 of each of the pushing members 53 is compressed between the relevant swing arm 532 and the relevant moving member 533. Thus, the elastic member 531 in each of the pushing members 53 has a stretching force urging itself to change toward a natural (i.e., uncompressed) state. When each of the pushing members 53 start deviating, a distance between the pivot of the swing arm 532 and the corresponding force-bearing portion 5210 of the cord adjusting member 52 would increase due to the swinging motion of the swing arm 532, which means that the moving member 533 would now have more distance to be moved relative to the swing arm 532. As a result, the moving member 533 could be pushed away from the swing arm 532 by the elastic member 531 to continuously push against the corresponding force-bearing portion 5210, whereby to push the cord adjusting member 52 to move. Therefore, during the process, the elastic member 531 of each of the pushing members 53 would provide a pushing force to push the cord adjusting member 52 away from the first position P1. In other words, on each side of the cord adjusting member 52, the force exerted on the sliding seat 521 provided by the elastic member 531 through the moving member 533 not only exerts in the direction perpendicular to the sliding seat 521, but also in the lateral direction of the headrail 10. This pushing force could assist the transmission effect that the transmission member 512 applies to the sliding seat 521, and would drive the cord adjusting member 52 to move in the lateral direction of the headrail 10. By further rotating the adjusting shaft 42, the follower 51 would continue to drive the cord adjusting member 52 to move, and the pushing members 53 also facilitates the movement of the cord adjusting member 52. The cord adjusting member 52 would be eventually moved to a second position P2. When the cord adjusting member 52 reaches the second position P2, the pushing members 53 would be substantially tilted as shown in FIG. 12. At this time, the elastic members 531 between the swing arms 532 and the moving members 533 would be stretched. For example, the elastic members 531 could be properly stretched to their natural state. Furthermore, the elastic members 531 would have a second length L2 greater than the aforementioned first length L1.

As shown in FIG. 12, when the cord adjusting member 52 is moved to the second position P2, the distance between the first through hole 11 and the first end 5211 would be shorten now. This means a length of the first cord 31 received in the headrail 10 would be also reduced. Since the first cord 31 remains taut due to the weight of the bottom rail 21, a length of the first cord 31 would be released out of the headrail 10 through the first through hole 11. Correspondingly, when the cord adjusting member 52 is moved to the second position P2 as shown in FIG. 12, the distance between the second through hole 12 and the second end 5212 would be elongated now. This means a length of the second cord 21 received in the headrail 10 would be also increased. Therefore, the second cord 32 would be retracted in the retracting direction into the headrail 10 through the second through hole 12. Since the first and second cords 31 and 32 respectively make a loop by veering at different ends of the cord adjusting member 52 in the current embodiment, the length of the first cord 31 released from the first through hole 11 or the length of the second cord 32 retracted into the second through hole 12 would be roughly two times the distance that the cord adjusting member 52 moves in the auxiliary adjusting module 50. The distance that the cord adjusting member 52 moves in the auxiliary adjusting module 50 would be the same as lengths of the transmission cords of the transmission member 512 that the bushing 511 releases out or retracted in. Therefore, though the bushing 511 and the drums 441 would be all driven to rotate by the same angle as the adjusting shaft 42 rotates, the lengths of the transmission cords released out or retracted in by the bushing 511 would depend on a diameter of the bushing 511, while the lengths of the first vertical portions 411 released out by the drums 441 and the lengths of the second vertical portions 412 retracted in by the drums 441 would depend on diameters of the drums 441. By properly configuring the diameters of the drums 411 and the bushing 511, the ratio between the retracted or released lengths of the cord and vertical portions may be adjusted.

Figure 13:
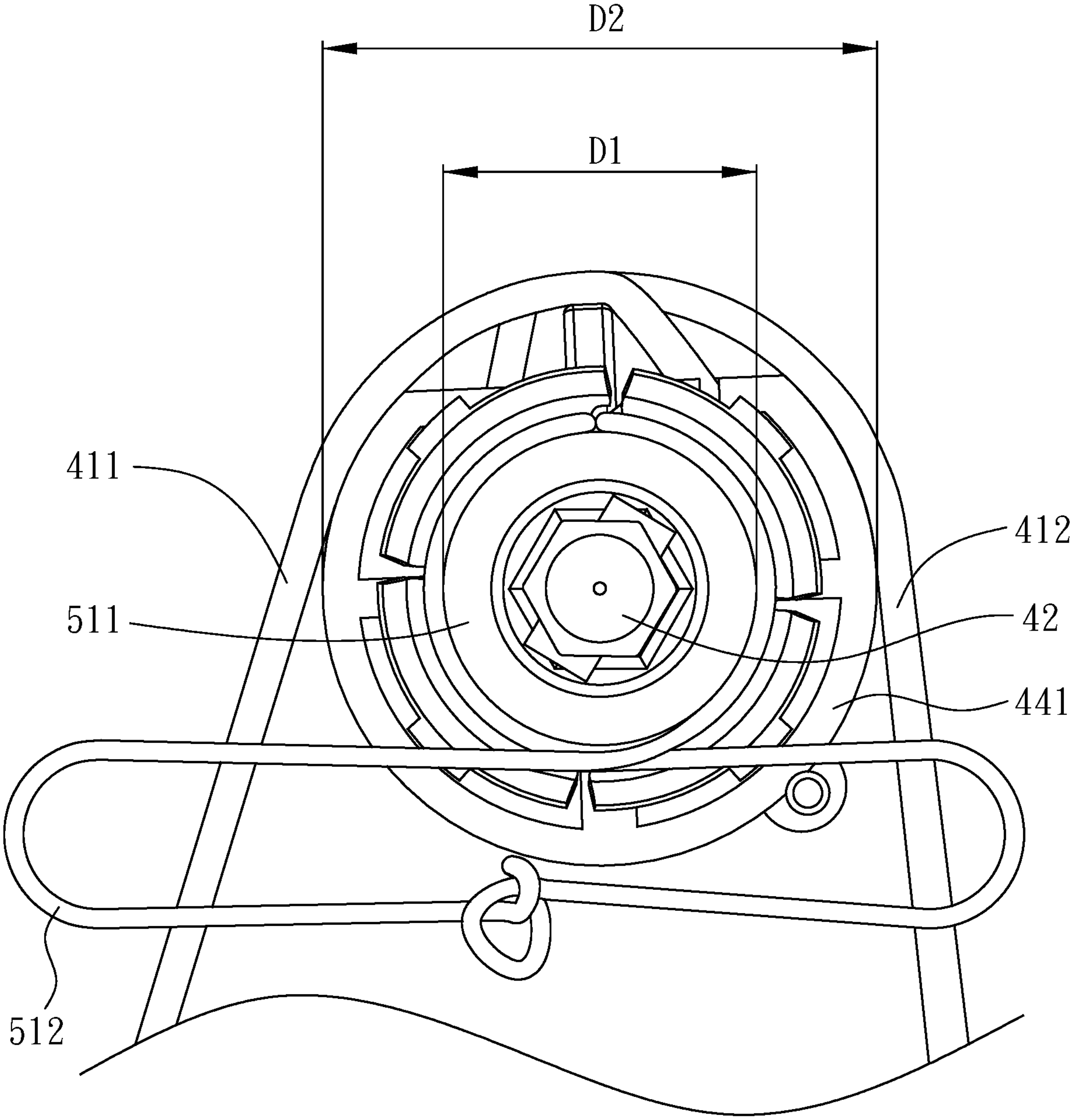
FIG. 13 is a side view of the bushing and the drum fitting over the adjusting shaft.

To make the window blind 1 close properly, the length of the first cord 31 released out from the first through hole 11 has to be at least equal to the length of the corresponding first vertical portion 411 released from the first through hole 11, and the length of the second cord 32 retracted into the second through hole 12 has to be at least equal to the length of the corresponding second vertical portion 412 retracted into the second through hole 12. Therefore, as shown in the current embodiment, since the released/retracted lengths of the cords 31 and 32 are two times the distance that the cord adjusting member 52 moves, a diameter D1 of the bushing 511 has to be greater than or equal to half of a diameter D2 of each of the drums 441. In the current embodiment, as shown in FIG. 13, the diameter D1 of the bushing 511 is about 0.6 time the diameter D2 of each of the drums 441 so that the length of the first cord 31 released from the first through hole 11 would be greater than the length of the corresponding first vertical portion 411 released from the first through hole 11, and the length of the second cord 32 retracted into the second through hole 12 would be greater than the length of the corresponding second vertical portion 412 retracted into the second through hole 12. In this way, the tilting angle of the bottom rail 21 would not be limited by the first and second cords 31 and 32, and the bottom rail 21 could be turned to a near vertical state in response to the movements between the first and second vertical portions 411 and 412 of the ladder strings 41. Furthermore, when the bottom rail 21 is turned to the nearly vertical state, the weight of the bottom rail 21 would also help the slats 20 turning to a nearly vertical position, whereby to make each two adjacent ones of the slats 20 have their adjacent sides abutted and minimize the gaps between the slats 20. In other embodiments, the length of the first cord 31 released from the first through hole 11 or the length of the second cord 32 retracted into the second through hole 12 are not limited to be two times the distance that the cord adjusting member 52 moves in the auxiliary adjusting module 50. The ratio of the lengths of the released/retracted lengths of the cords 31 and 32 and the moving distance of the cord adjusting member 52 can be adjusted to meet various requirements in other embodiments. To meet different changes in the ratio mention above and the various requirements in different embodiments, the ratio of the diameters of the bushing 511 and each of the drums 441 can be also changed accordingly.

To change the window blind 1 from the closed state which blocks out the most light to the open state which lets in the most light, a user can manipulate the driving unit 43 of the tilting module 40 to rotate the adjusting shaft 42 in the second rotating direction, whereby to change the shape of the ladder strings 41 and make the tilting unit 44 bring the rungs of the ladder strings 41 back to be substantially horizontal. At this time, the auxiliary adjusting module 50 would also operate inversely as opposed to the way it operates in the previously described scenario, wherein the bushing 511 of the follower 51 would be rotated inversely along with the adjusting shaft 42. The rotation of the bushing 511 would drive the transmission member 512 to move the cord adjusting member 52 in a direction opposite to the direction in which the cord adjusting member 52 moves while the window blind 1 is being operated toward the closed state. As a result, the cord adjusting member 52 would be moved from the second position P2 at a side of the case 54 to the first position P1 at the middle of the case 54. The pushing members 53 would also leave the tilted positions and return to the positions where they face each other. Since the first and second cords 31 and 32 are configured in a manner that they are movable along with the cord adjusting member 52, the movement of the cord adjusting member 52 would affect the first and second cords 31, 32 in the headrail 10 as well. Specifically, the movement of the sliding seat 521 would increase the length of the first cord 31 inside the auxiliary adjusting module 50 so that the first cord 31 would be retracted back into the headrail 10 through the first through hole 11. Correspondingly, the movement of the sliding seat 521 and the weight of the bottom rail 21 would decrease the length of the second cord 32 inside the auxiliary adjusting module 50, and therefore the second cord 32 would be released out of the headrail 10 through the second through hole 12. As a result, the window blind 1 would be in the open state shown in FIGS. 2-3.

If the driving unit 43 of the tilting module 40 continues to be further rotated after the window blind 1 has returned to the open state shown in FIGS. 2-3, the tilting unit 44 would change the shape of the ladder strings 41 again and tilt the slats 20. However, at this time, the rungs of the ladder strings 41 are tilted with the left side of the rungs higher than the right side of the rungs as opposite to what is shown in FIG. 5. In other words, the front side of the rungs of the ladders string 41 is higher than the rear side of the rungs of the ladder strings 41, as opposed to what is shown in FIG. 4. As a result, the ladder strings 41 would tilt the slats 20 placed on the rungs and the bottom rail 21 in another manner. In other words, though not shown in the drawings, it should be understood that the slats 20 and the bottom rail 21 are tilted with their left side higher than the right side if seen from the view angle of FIG. 5. Though the slats 20 are now turned in a different tilt direction during the process of changing the window blind 1 from the open state to the closed state, the components in the auxiliary adjusting module 50 all work in a similar way but move in opposite directions. This means the components in the auxiliary adjusting module 50 would operate in directions opposite to those shown in FIG. 10. Specifically, the adjusting shaft 42 could rotate in a second rotating direction (i.e., clockwise in FIG. 10), whereby to drive the bushing 511 of the follower 51 to rotate in the second rotating direction as well. The transmission member 512 would then drive the cord adjusting member 52 to move from the first position P1 in a direction away from the second position P2. While the cord adjusting member 52 is being moved, the pushing members 53 would also move in a direction opposite to that shown in FIG. 12. In other words, the pushing members 53 would be moved in a direction toward the top of FIG. 12 from the position P1 where they face each other, and would eventually reach the position on another side of the case 54 opposite to the position P2 in FIG. 12. The first and second cords 31 and 32 are movable along with the cord adjusting member 52, and therefore would also change their states along with the movement of the cord adjusting member 52. The movement of the sliding seat 521 would decrease the length of the first cord 31 in the auxiliary adjusting module 50 so that the first cord 31 would be released out of the headrail 10 through the first through hole 11. Correspondingly, the movement of the sliding seat 521 would increase the length of the second cord 32 in the auxiliary adjusting module 50 so that the second cord 32 would be retracted into the headrail 10 through the second through hole 12.

In above embodiments, each pair of first cord 31 and second cord 32 of the window blind 1 could pass the auxiliary adjusting module 50 with the same or similar arrangement. While the tilting module 40 is being manipulated, each pair of first cord 31 and second cord 32 would be driven by the auxiliary adjusting module 50, whereby to adjust the lengths of cords received in the headrail 10 along with the operation of the tilting module 40. Therefore, the bottom rail 21 and slats 20 near the bottom rail 21 can be properly tilted and not limited by the cords. Eventually, the window blind 1 could be in the closed state without letting in unwanted light, especially in the lower half of the window blind 1. In addition, the movement of the cord adjusting member 52 would be also facilitated by the pushing force toward the second position P2 provided by the pushing member 53. The slats 20 and the bottom rail 21 of the window blind 1 could precisely stay at required positions. In the current embodiment, the window blind 1 comprises only one auxiliary adjusting module 50, and two pairs of first and second cords 31 and 32 provided in the window blind 1 would pass through the same auxiliary adjusting module 50. In another embodiment, there are multiple auxiliary adjusting modules 50 provided in the window blind 1, and each pair of first cord 31 and second cord 32 could pass through different auxiliary adjusting modules 50. In such an embodiment, the window blind 1 could still be fully closed without letting in light.

Figure 14:
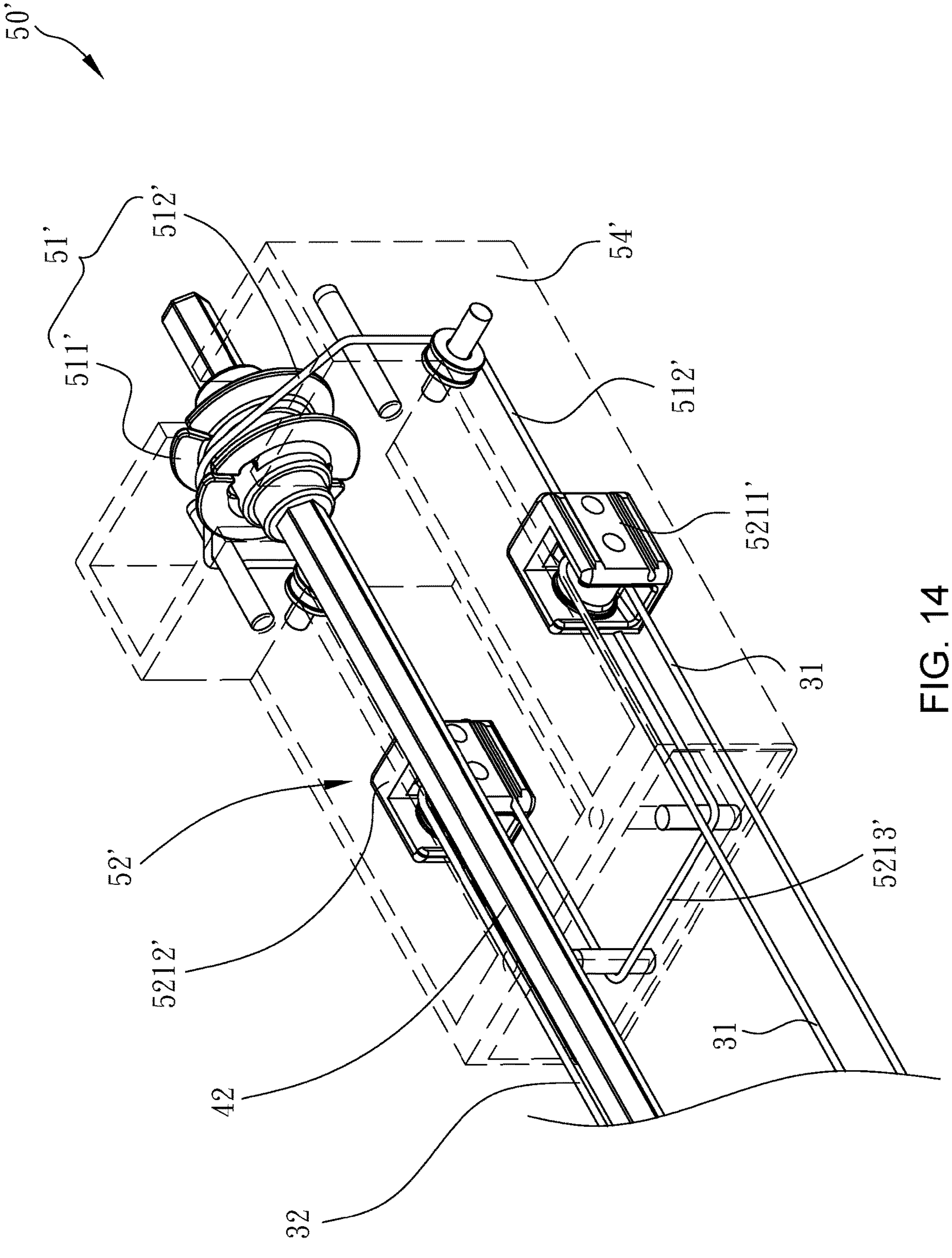
FIG. 14 is a perspective view of a second embodiment of the auxiliary adjusting module.
Figure 15:
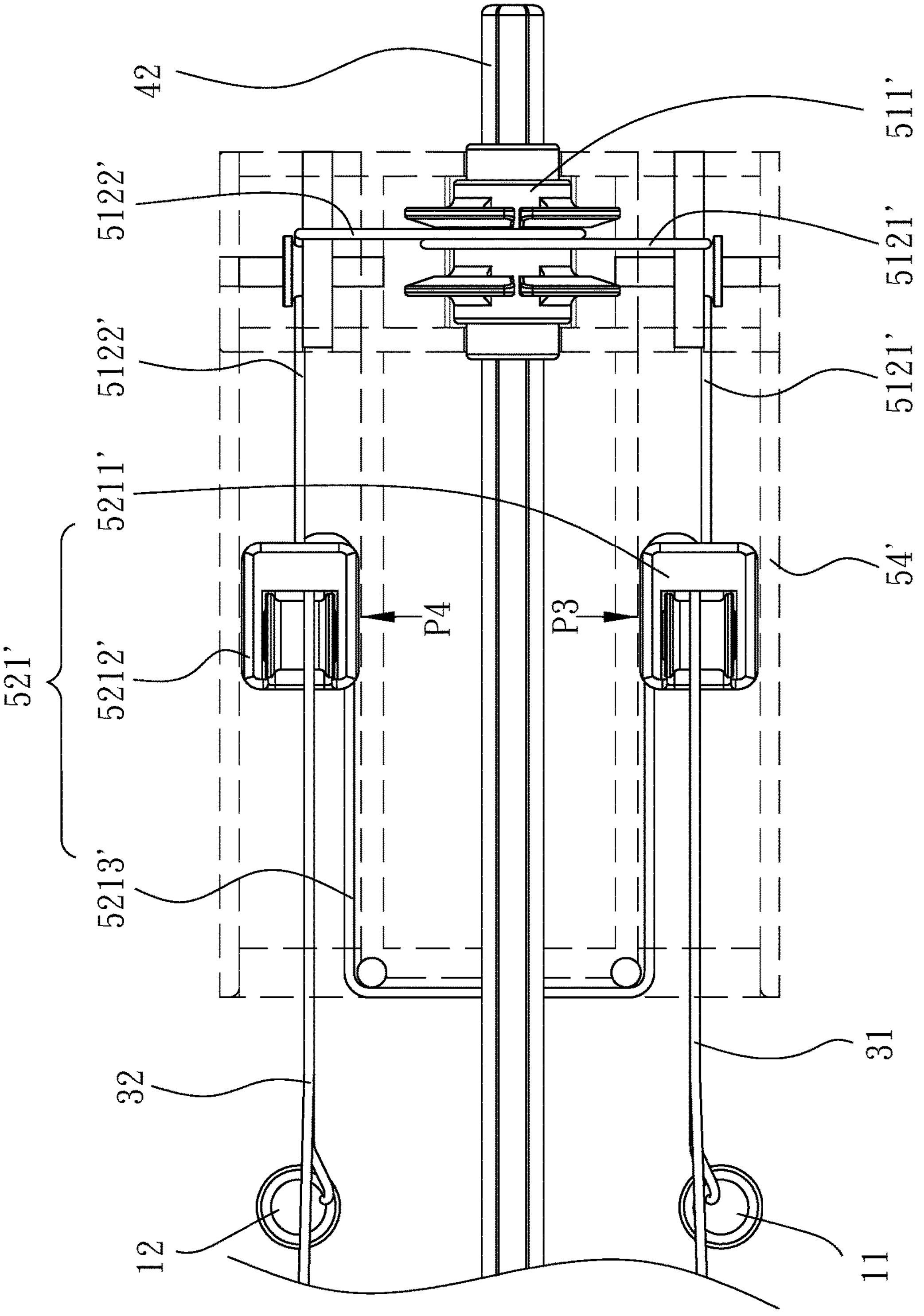
FIG. 15 is a top view the second embodiment of the auxiliary adjusting module when the window blind is in the open state as shown in FIGS. 2-3.
Figure 16:
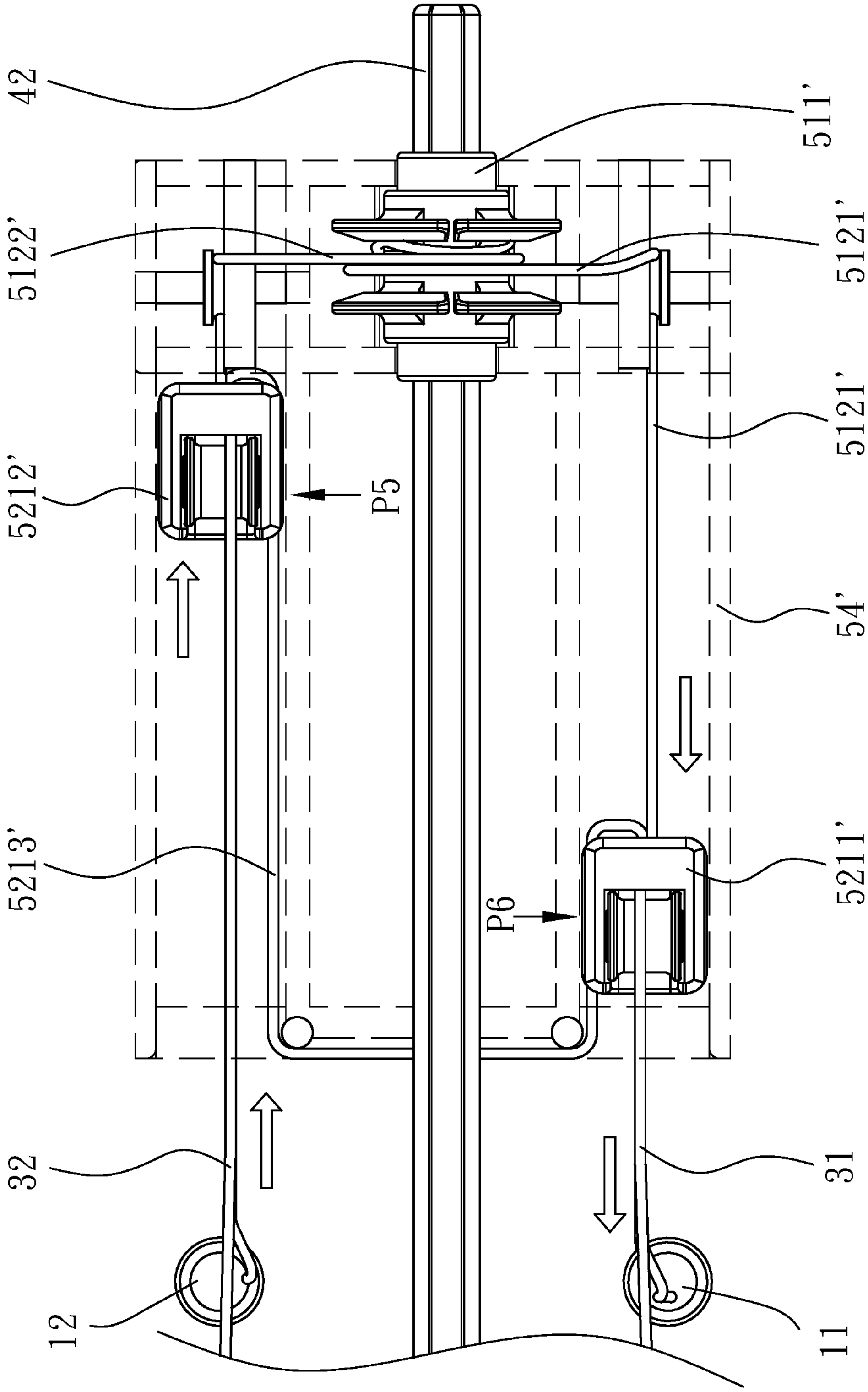
FIG. 16 is a top view the second embodiment of the auxiliary adjusting module when the window blind is in the closed state as shown in FIGS. 4-5.

A second embodiment of the auxiliary adjusting module is shown in FIGS. 14-16. The auxiliary adjusting module 50' comprises another possible implementation of a cord adjusting member 52'. Similar to the previous embodiment, a follower 51' of the auxiliary adjusting module 50' is movable along with a adjusting shaft 42 through a bushing 511'. A transmission member 512' has two ends fixedly connected to the bushing 511' and a sliding seat 521', respectively, so that the transmission member 512' can be driven to move by the bushing 511'. As opposed to a single integrated sliding seat 521 realized in the first embodiment, the sliding seat may also be realized with one or more discrete components in other embodiments. In the current embodiment, the sliding seat 521' of the cord adjusting member 52' comprises a first sliding base 5211', a second sliding base 5212', and a linking cord 5213' connected between the first sliding base 5211' and the second sliding base 5212'. The transmission member 512' comprises a first transmission cord 5121' and a second transmission cord 5122'. The first transmission cord 5121' contacts and veers along a surface of the bushing 511' with an end of the first transmission cord 5121' connected to the bushing 511'. Another end of the first transmission cord 5121' is connected to the first sliding base 5211'. The second transmission cord 5122' contacts and veers along the surface of the bushing 511' with an end of the second transmission cord 5122' connected to the bushing 511'. Another end of the second transmission cord 5122' is connected to the second sliding base 5212'. The linking cord 5213' changes its direction by passing through one or more direction-changing components (e.g., a pin). Two ends of the linking cord 5213' are respectively connected to the first sliding base 5211' and the second sliding base 5212'. By utilizing grooves, rails or other guiding structures (not shown in the figures) provided in the case 54', the first sliding base 5211' and the second sliding base 5212' can be moved inside the case 54' in the longitudinal direction of the headrail 10. Connected by the length-fixed linking cord 5213', the first sliding base 5211' and the second sliding base 5212' move correspondingly in in opposite directions in the case 54'.

Similar to the first embodiment, for ease of interpretation, the first cord 31 and the second cord 32 referred to in the following paragraphs are on the right side of the window blind 1 shown in FIG. 2. The embodiment below and FIGS. 14-16 are used to explain the configurations on the right side of the window blind 1. The first cord 31 extends out of the actuation unit 33. After that, the first cord 31 contacts and veers at a rod of the first sliding base 5211', and then extends out of the headrail 10 through the first through hole 11. Similarly, the second cord 32 also extends out of the actuation unit 33. After that, the second cord 32 contacts and veers at a rod of the second sliding base 5212', and then extends out of the headrail 10 through the second through hole 12. Since the first and second cords 31 and 32 both pass through the sliding seat 521', the lengths of the first and second cords 31 and 32 in the auxiliary adjusting module 50' would be changed along with the overall movement of the sliding seat 521' and the weight of the bottom rail 21. Consequently, the lengths of the first and second cords 31 and 32 received in the headrail 10 can be adjusted. Specifically, the length of the first cord 31 between the first through hole 11 and the first sliding base 5211' and the length of the second cord 32 between the second through hole 12 and the second sliding base 5212' can be adjusted. In this way, the length of the first cord 31 released out of or retracted into the first through hole 11 of the headrail 10 could be adjusted, and so could the length of the second cord 32 released out of or retracted into the second through hole 12 of the headrail 10.

As shown in FIGS. 14-15, the first and second sliding bases 5211', 5212' of the auxiliary adjusting module 50' are respectively located at first positions P3 and P4 near the middle of the case 54' when the window blind 1 is in the open state as illustrated in FIGS. 2-3. As it can be seen in FIG. 15, there are rooms in both directions for the first and second sliding bases 5211' and 5212' to move. At this time, the length of the first cord 31 and the length of the second cord 32 in the auxiliary adjusting module 50' have equal lengths. As shown in the top view of FIG. 16, when the window blind 1 is being adjusted toward the closed state illustrated in FIGS. 4-5, the driving unit 43 is manipulated to rotate the adjusting shaft 42, and the bushing 511' of the follower 51' would rotate along with the adjusting shaft 42. At this time, the second transmission cord 5122' would be retracted by the bushing 511', and therefore would drive the second sliding base 5212' to slide right to a second position P5 of the second sliding base 5212'. Meanwhile, a certain length pf the first transmission cord 5121' would be correspondingly released from the bushing 511', and the linking cord 5213' would be also pulled by the second sliding base 5212'. The first sliding base 5211' would be driven to slide left to a second position P6 of the first sliding base 5211'. The first sliding base 5211' and the second sliding base 5212' would be moved substantially the same distance but in opposite directions in the longitudinal direction of the headrail 10. In other words, though the first position P3 of the first sliding base 5211' and the first position P4 of the second sliding base 5212' are configured to be near in the case 54', the second positions P5 and P6 of each of the sliding bases 5211' and 5212' are respectively away from the first positions P3 and P4 in different directions. Due to the operation of the auxiliary adjusting module 50' and the weight of the bottom rail 21, the first cord 31 movable along with the first sliding base 5211' would be released out of the headrail 10 through the first through hole 11, and the second cord 32 movable along with the second sliding base 5212' would be retracted into the headrail 10 through the second through hole 12. In the current embodiment, the length that the first cord 31 released out from the first through hole 11 and the length that the second cord 32 retracted into the second through hole 12 are about two times the distances that the first sliding base 5211' move in the auxiliary adjusting module 50' or two times the distances that the second sliding base 5212' move in the auxiliary adjusting module 50'.

Similar to the previous embodiment, to provide the best closure effect for the overall of the window blind 1, a diameter of the bushing 511' has to be at least greater than or equal to half of a diameter of each of the drums 441. In this way, the length of the first cord 31 released out from the first through hole 11 would be greater than or equal to the length of the corresponding first vertical portion 411 released from the first through hole 11, and the length of the second cord 32 retracted into the second through hole 12 would be greater than or equal to the length of the corresponding second vertical portion 412 retracted into the second through hole 12. Therefore, the tilting angle of the bottom rail 21 would not be limited by the first and second cords 31 and 32. In another embodiment, the lengths that the first cord 31 released out from the first through hole 11 and the second cord 32 retracted into the second through hole 12 could be another appropriate multiple of the distances that the first sliding base 5211' or the second sliding base 5212' move in the auxiliary adjusting module 50. The ratio of the diameter of the bushing 511' and the diameter of each of the drums 441 could be also adjusted depending on the multiple between the released/retracted cord length and the moving distance of the sliding bases and other requirements.

To change the window blind 1 from the closed state which blocks out the most light back to the open state which lets in the most light, the user can manipulate the driving unit 43 of the tilting module 40 to inversely rotate the adjusting shaft 42. Whereby the tilting unit 44 would bring the rungs of the ladder strings 41 back to the substantially horizontal position. At this time, the auxiliary adjusting module 50' would operate in opposite directions, and the bushing 511' of the follower 51' would be rotated in the opposite direction along with the adjusting shaft 42. The first transmission cord 5121' would be retracted by the bushing 511' to drive the first sliding base 5211' to move right to the first position P3 of the first sliding base 5211'. On the other hand, the second transmission cord 5122' would be released from the bushing 511'. Furthermore, the linking cord 5213' would be also pulled by the first sliding base 5211' so that the second sliding base 5212' would be driven to slide left and return to the first position P4 of the second sliding base 5212'. Due to the change in the overall condition of the cord adjusting member 52' (i.e., the change in the positions of the first and second sliding bases 5211' and 5212'), the first cord 31 and second cord 32 would also change their conditions accordingly. The first sliding base 5211' would pull the first cord 31 to increase its length in the auxiliary adjusting module 50', whereby to retract the first cord 31 into the headrail 10 through the first through hole 11. Correspondingly, the movement of the second sliding base 5212' and the weight of the bottom rail 21 would decrease the length of the second cord 32 in the auxiliary adjusting module 50', whereby to release the second cord 32 out of the headrail 10 through the second through hole 12. As a result, the window blind 1 would return to the open state shown in FIGS. 2-3.

After the window blind 1 returns to the open state shown in FIGS. 2-3, if the driving unit 43 of the tilting module 40 continues to be rotated inversely, the tilting unit 44 would tilt the slat 20 again in the other tilt direction. But this time, the rungs would be tilted in a manner that their left side is higher than the right side as opposed to what is shown in FIG. 5. The ladder strings 41 would therefore tilt the slats 20 placed on the rungs and the bottom rail 21 connected to the first and second vertical portions 411 and 412. In other words, though not shown in the drawings, it should be understood that the slats 20 and the bottom rail 21 are tilted with their left side higher than the right side as opposed to what is shown in FIG. 5. Though the slats 20 are now turned in a different tilt direction during the process of changing the window blind 1 from the open state to the closed state, the components in the auxiliary adjusting module 50' all work in the same or similar way. This means some components in the auxiliary adjusting module 50' would operate in directions opposite to those shown in FIG. 16. Specifically, the adjusting shaft 42 could rotate inversely, whereby to drive the bushing 511' to rotate inversely as well. The first transmission cord 5121' would be further retracted by the bushing 511' to drive the first sliding base 5211' to slide from the first position P3 of the first sliding base 5211' in a direction opposite to the second position P6. The second transmission cord 5122' would be further released from the bushing 511'. In addition, the linking cord 5213' would be also pulled by the first sliding base 5211'. Therefore, the second sliding base 5212' would be driven to slide from the first position P4 of the second sliding base 5212' in a direction opposite to the second position P5. Due to the change in the overall condition of the cord adjusting member 52' (i.e., the change in the positions of the first and second sliding bases 5211' and 5212'), the first cord 31 and second cord 32 would also change their condition accordingly. The movement of the first sliding base 5211' would increase the length of the first cord 31 in the auxiliary adjusting module 50', whereby to retract the first cord 31 into the headrail 10 through the first through hole 11. Correspondingly, the movement of the second sliding base 5212' and the weight of the bottom rail 21 would decrease the length of the second cord 32 in the auxiliary adjusting module 50', whereby to release the second cord 32 out of the headrail 10 through the second through hole 12.

With the collaboration of the aforementioned mechanisms and by making the first cord 31 and the second cord 32 of the window blind 1 both pass through the auxiliary adjusting module 50', the first cord 31 and the second cord 32 could be driven by the auxiliary adjusting module 50' to move along with the tilting module 40 when the tilting module 40 is being manipulated. As a result, the lengths of the first cord 31 and the second cord 32 received in the headrail 10 could be adjusted, whereby the bottom rail 21 could be turned to a fully closed position without being limited by the first and second cords 31 and 32. Therefore, the window blind 1 could be fully closed and minimize the light passing through, especially in the lower half of the window blind 1.

Figure 17:
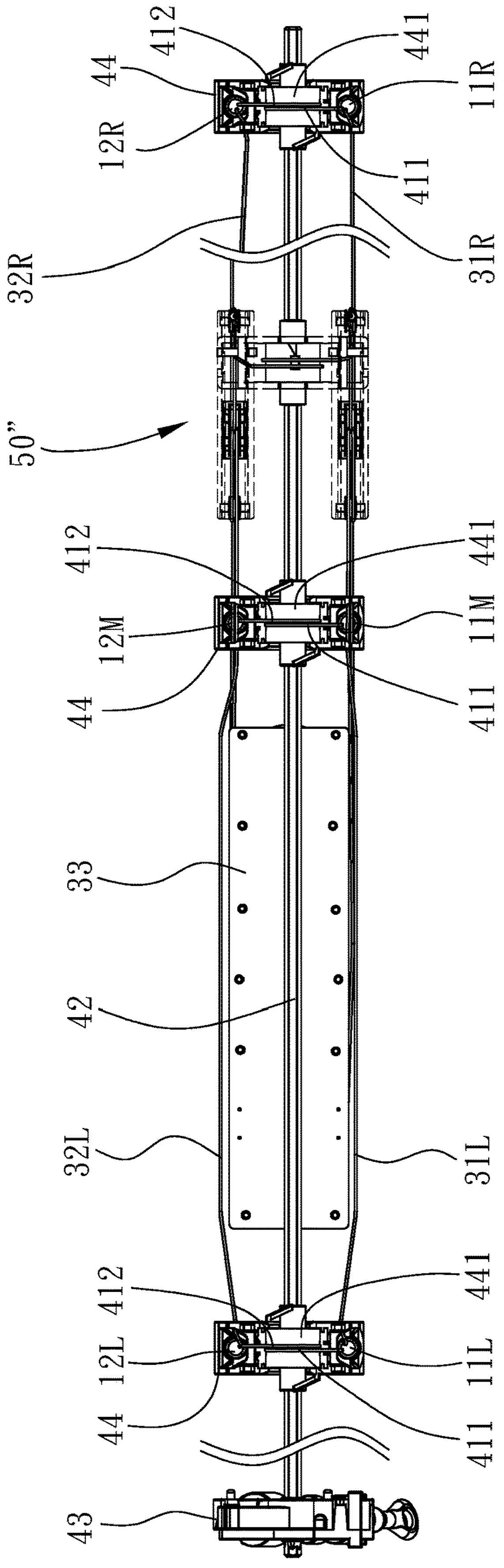
FIG. 17 is a top view of a third embodiment of the auxiliary adjusting module, along with a simplified example configuration inside the headrail of the window blind.

A third embodiment of the auxiliary adjusting module 50" is shown in FIGS. 17-20. In FIGS. 17-20, another configuration of the components in the headrail 10 which works with the auxiliary adjusting module 50" is also illustrated. As shown in FIG. 17, the tilting module 40 comprises the ladder strings 41 (with the first vertical portions 411 and the second vertical portions 412 can be seen in FIG. 17), the adjusting shaft 42, the driving unit 43, and multiple tilting units 44. In the current embodiment, the arrangement of these components is, from left to right in FIG. 17, the driving unit 43, one of the tilting units 44, the actuation unit 33, another one of the tilting units 44, the auxiliary adjusting module 50", and yet another one of the tilting units 44. The adjusting shaft 42 passes through the components of the tilting module 40 and the auxiliary adjusting module 50". Different from the previous embodiments, the auxiliary adjusting module 50" of the current embodiment is provided between two of the tilting units 44 of the tilting module 40.

Figure 18:
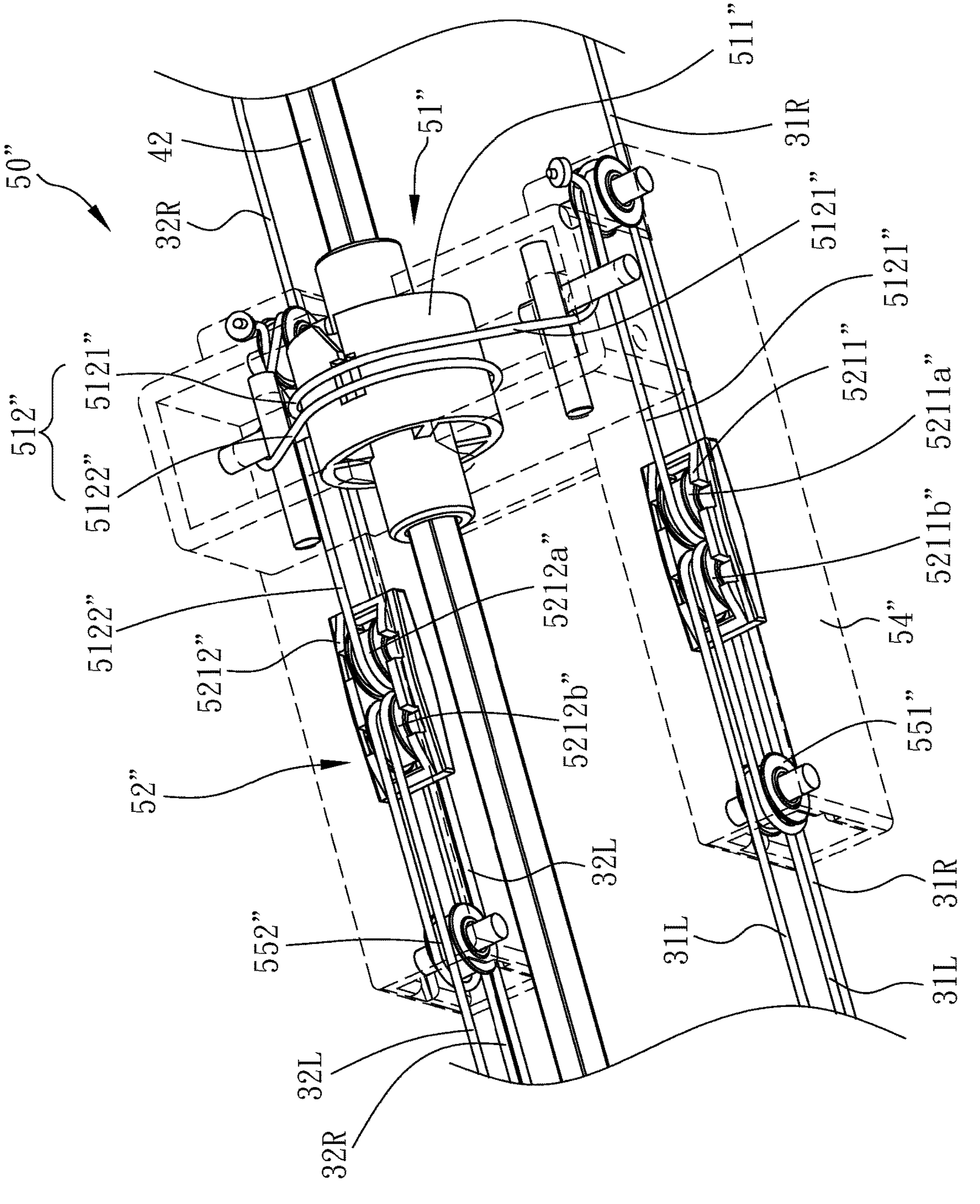
FIG. 18 is a perspective view of the third embodiment of the auxiliary adjusting module.

As shown in FIG. 18, the auxiliary adjusting module 50" comprises a follower 51" and a cord adjusting member 52" provided in a case 54". In addition, a first direction-changing member 551" and a second direction-changing member 552" are further provided. The follower 51" of the auxiliary adjusting module 50" is movable along with the adjusting shaft 42 through a bushing 511". A transmission member 512" passes through a sliding seat 521", wherein two ends of the transmission member 512" are fixedly connected to the bushing 511" and the case 54", respectively. The sliding seat 521" comprises a first sliding base 5211" and a second sliding base 5212". The transmission member 512" comprises a first transmission cord 5121" and a second transmission cord 5122". The first transmission cord 5121" contacts and veers along a surface of the bushing 511", and also contacts and veers at a rod **5211*a*" of the first sliding base 5211" with an end of the first transmission cord 5121" connected to the bushing 511". Another end of the first transmission cord 5121" is connected to the case 54". The second transmission cord 5122" contacts and veers along the surface of the bushing 511", and also contacts and veers at a rod 5212*a*" of the second sliding base 5212" with an end of the second transmission cord 5122" connected to the bushing 511". Another end of the second transmission cord 5122" is connected to the case 54". The first sliding base 5211" and the second sliding base 5212" are movable inside the case 54" in the longitudinal direction of the headrail 10. In addition, the case 54" could be further provided with grooves, rails or other guiding structures (not shown in the figures) to guide the moving directions of the first sliding base 5211" and the second sliding base 5212". To meet various requirements, the first and the second transmission cords 5121" and 5122" could be also fixedly connected to the first and second sliding bases 5211" and 5212"** at other suitable positions in other embodiments.

As shown in FIG. 17, in the current embodiment, the window blind 1 has two first cords 31 at the front side of the slats 20, and two second cords 32 at the rear side of the slats 20. The headrail 10 has two through holes provided below each of the tilting units 44, including the aforementioned first and second through holes on the right side, as mentioned in the previous embodiments. Each of the first and second cords 31 and 32 extends out of the headrail 10 through one of the through holes on the left and right sides, respectively. For ease of interpretation, the through holes on the left side of FIG. 17 are respectively defined as a left first through hole 11L and a left second through hole 12L, and the through holes on the right side of FIG. 17 are defined as a right first through hole 11R and a right second through hole 12R. In addition, the through holes at the middle of FIG. 17 are defined as a middle first through hole 11M and a middle second through hole 12M. Accordingly, the cords passing through the left first through hole 11L and the right first through hole 11R are respectively defined as a left first cord 31L a right first cord 31R. Similarly, the cord passing through the left second through hole 12L and the right second through hole 12R are respectively defined as a left second cord 32L and a right second cord 32R. Each of the tilting units 44 has a drum 441, wherein a first vertical portion 411 and a second vertical portion 412 are connected to the drum 441. For the tilting unit 44 on the left side of FIG. 17, the corresponding first vertical portion 411 extends out of the headrail 10 through the left first through hole 11L, and the corresponding second vertical portion 412 extends out of the headrail 10 through the left second through hole 12L. For the tilting unit 44 on the right side of FIG. 17, the corresponding first vertical portion 411 extends out of the headrail 10 through the right first through hole 11R, and the corresponding second vertical portion 412 extends out of the headrail 10 through the right second through hole 12R. For the tilting unit 44 at the middle of FIG. 17, the corresponding first vertical portion 411 extends out of the headrail 10 through the middle first through hole 11M, and the corresponding second vertical portion 412 extends out of the headrail 10 through the middle second through hole 12M.

The relationships between the cords 31L, 31R, 32L, and 32R and the auxiliary adjusting module 50" are specified in the following paragraphs. Since the auxiliary adjusting module 50" is located between two of the tilting units 44, the left first cord 31L enters the auxiliary adjusting module 50" from a left side of the auxiliary adjusting module 50" after extending out of the actuation unit 33. In the auxiliary adjusting module 50", the left first cord 31L contacts and veers at a rod **5211*b*" of the first sliding base 5211". The left first cord 31L extends out of the auxiliary adjusting module 50" from the left side of the auxiliary adjusting module 50", and extends out of the headrail 10 through the left first through hole 11L below the tilting unit 44 on the left side. The right first cord 31R enters the auxiliary adjusting module 50" from the left side of the auxiliary adjusting module 50" after extending out of the actuation unit 33. In the auxiliary adjusting module 50", the right first cord 31R contacts and veers at the rod 5211***b*" of the first sliding base 5211" and then the first direction-changing member 551". The right first cord 31R extends out of the auxiliary adjusting module 50" from a right side of the auxiliary adjusting module 50", and extends out of the headrail 10 through the right first through hole 11R below the tilting unit 44 on the right side. The left second cord 32L enters the auxiliary adjusting module 50" from the left side of the auxiliary adjusting module 50" after extending out of the actuation unit 33. In the auxiliary adjusting module 50", the left second cord 32L contacts and veers at a rod 5212*b*" of the second sliding base 5212". The left second cord 32L extends out of the auxiliary adjusting module 50" from the left side of the auxiliary adjusting module 50", and extends out of the headrail 10 through the left second through hole 12L below the tilting unit 44 on the left side. The right second cord 32R enters the auxiliary adjusting module 50" from the left side of the auxiliary adjusting module 50" after extending out of the actuation unit 33. In the auxiliary adjusting module 50", the right second cord 32R contacts and veers at the rod 5212*b*" of the second sliding base 5212" and then the second direction-changing member 552". The right second cord 32R extends out of the auxiliary adjusting module 50" from the right side of the auxiliary adjusting module 50", and extends out of the headrail 10 through the right second through hole 12R below the tilting unit 44 on the right side.

Figure 19:
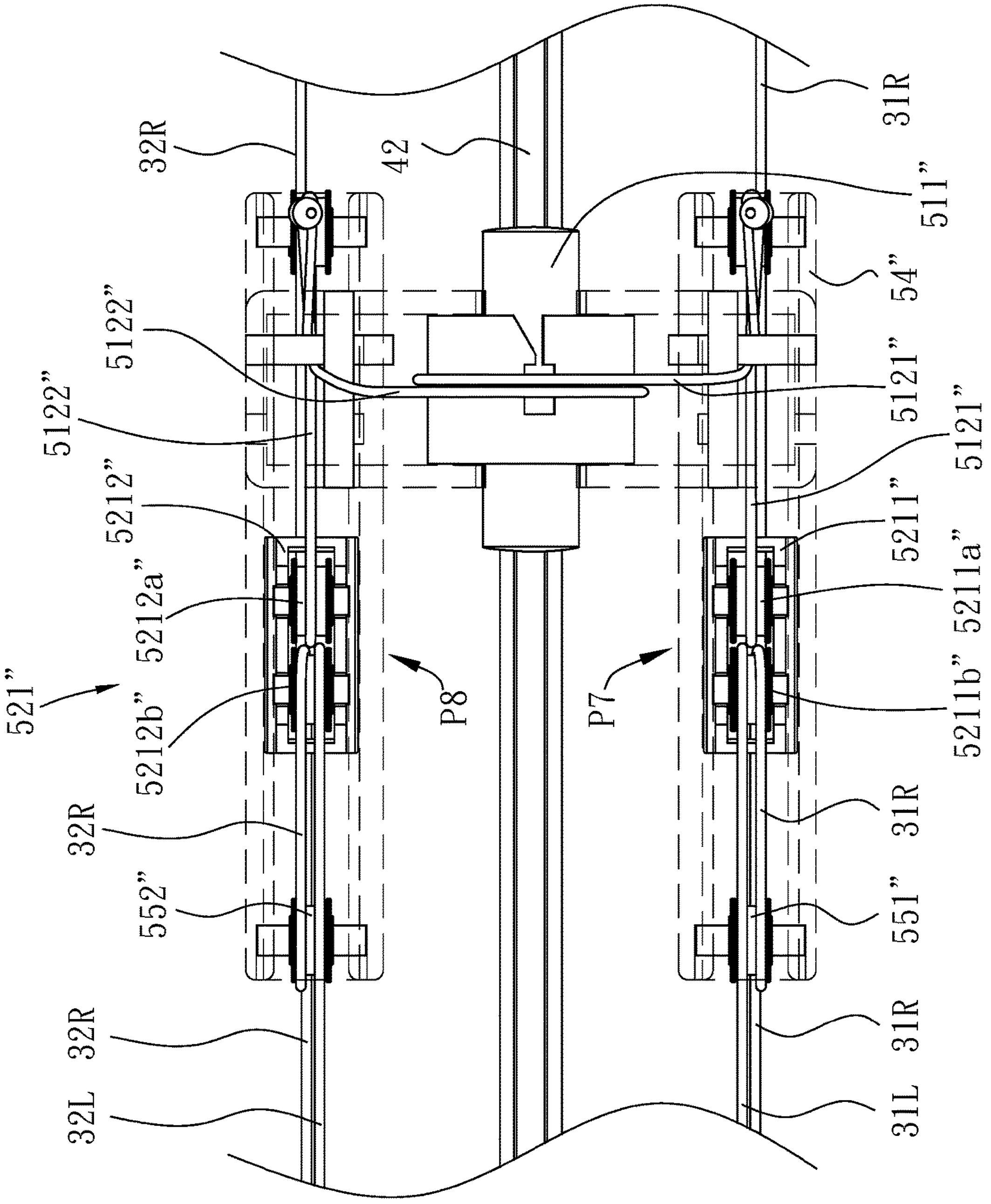
FIG. 19 is a top view showing the third embodiment of the auxiliary adjusting module when the window blind is in the open state as shown in FIGS. 2-3.
Figure 20:
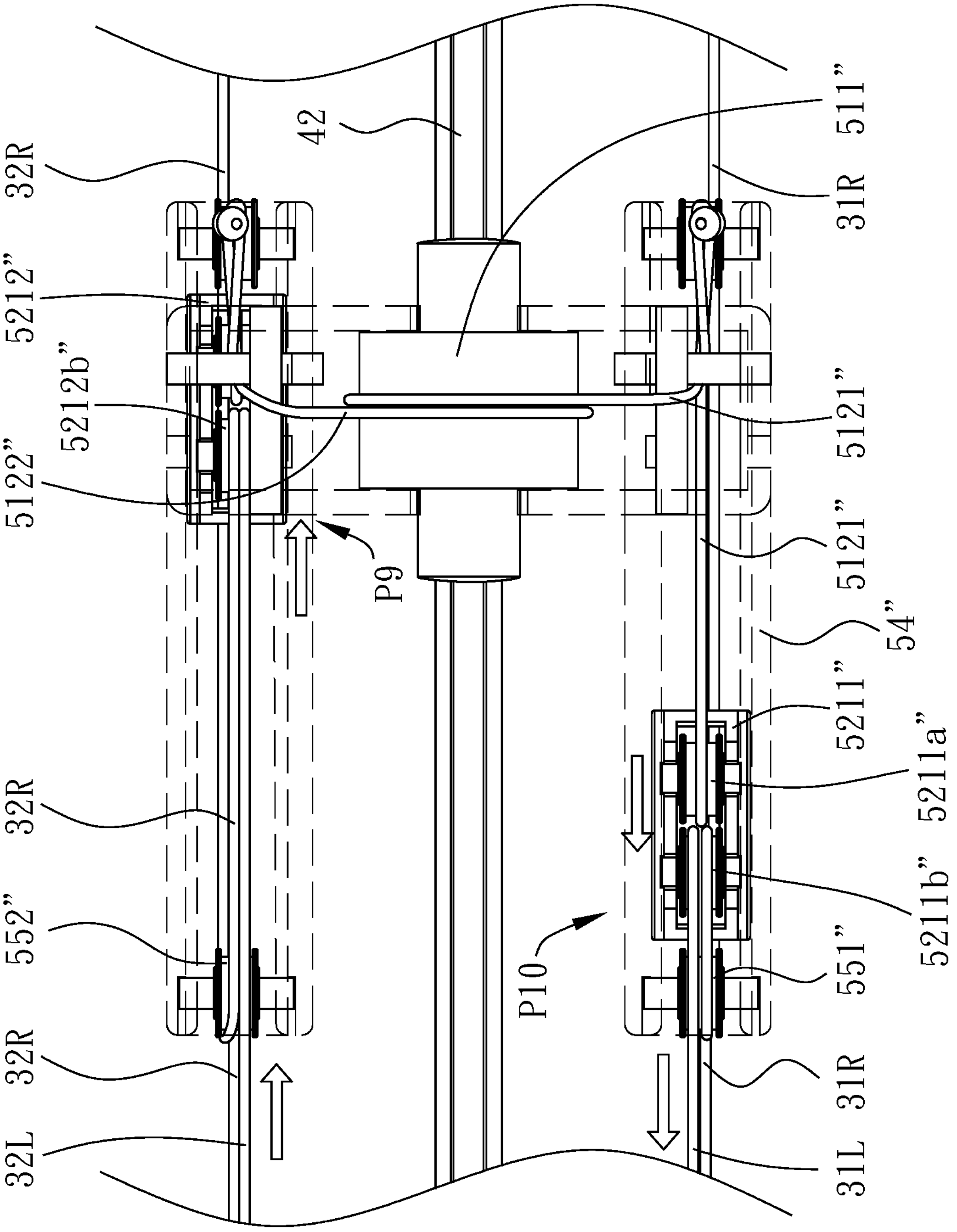
FIG. 20 is a top view showing the third embodiment of the auxiliary adjusting module when the window blind is in the closed state as shown in FIGS. 4-5.

As shown in FIGS. 18-20, the first and second sliding bases 5211", 5212" of the auxiliary adjusting module 50" are respectively located near the middle of the case 54" when the window blind 1 is in the open state as illustrated in FIGS. 2-3. Herein the position of the first sliding base 5211" is defined as a first position P7, the position of the second sliding base 5212" is defined as a first position P8. The first and second sliding bases 5211" and 5212" have rooms in both directions for them to move. When the window blind 1 is being adjusted toward the closed state shown in FIGS. 4-5, the driving unit 43 would be manipulated to rotate the adjusting shaft 42, and the bushing 511" of the follower 51" would be rotated along with the adjusting shaft 42. Meanwhile, the second sliding base 5212" would be driven by the second transmission cord 5122" to slide right to a second position P9 of the second sliding base 5212". Since the first transmission cord 5121" would be released from the bushing 511" for a corresponding length, and due to the driving of the weight of the bottom rail 21, the first sliding base 5211" would be driven to slide left to a second position P10 of the first sliding base 5211", as shown in FIG. 20. Similar to the previous embodiment, the second position P10 of the first sliding base 5211" and the second position P9 of the second sliding base 5212" are respectively separated away from the first positions P7 and P8 in opposite directions along the longitudinal direction of the headrail 10. Due to the operation of the auxiliary adjusting module 50" and the weight of the bottom rail 21, the left and right first cords 31L and 31R which are movable along with the first sliding base 5211" would be respectively released out of the headrail 10 through the left and right first through holes 11L and 11R, and the left and right second cords 32L and 32R which are movable along with the second sliding base 5212" would be respectively retracted into the headrail 10 through the left and right second through holes 12L and 12R. In the current embodiment, the lengths that the left and right first cords 31L and 31R respectively released out from the left and right first through holes 11L and 11R are about two times the distance that the first sliding base 5211" moves in the case 54". The lengths that the left and right second cords 32L and 32R respectively retracted into the left and right second through holes 12L and 12R are also about two times the distance that the second sliding base 5212" moves in the case 54".

Similar to the previous embodiments, to provide the best closure effect for the overall of the window blind 1, a diameter of the bushing 511" has to be at least greater than or equal to half of a diameter of each of the drums 441. In this way, the length of the left first cord 31L released out from the left first through hole 11L would be greater than or equal to the length of the corresponding first vertical portion 411 released from the left first through hole 11L, and the length of the left second cord 32L retracted into the left second through hole 12L would be greater than or equal to the length of the corresponding second vertical portion 412 retracted into the left second through hole 12L. Similarly, the length of the right first cord 31R released from the right first through hole 11R would be greater than or equal to the length of the corresponding first vertical portion 411 released from the right first through hole 11R, and the length of the right second cord 32R retracted into the right second through hole 12R would be greater than or equal to the length of the corresponding second vertical portion 412 retracted into the right second through hole 12R. The lengths of the aforementioned left and right first cords 31L and 31R released out from the left and right first through holes 11L and 11R would be greater or at least equal to the length of the first vertical portion 411 released out from the middle first through hole 11M. The length of the aforementioned left and right second cords 32L and 32R retracted into the left and right second through holes 12L and 12R would be greater or at least equal to the length of the second vertical portion 412 which is retracted into the middle second through hole 12M. In this way, the tilting angle of the bottom rail 21 would not be limited by the left first and second cord 31L and 32L and the right first and second cords 31R and 32R, and therefore the slats 20 and the bottom rail 21 could be effectively tilted to provide a better closure effect.

The multiple of the released or retracted lengths relative to the distance that the sliding base moves may be adjusted according to different design considerations. In another embodiment, the case could be provided with more pins for the cords to form more loops for providing a different integer multiple. In this embodiment, the first direction-changing member 551" and the second direction-changing member 552" are realized with pins to change the direction of cords. If a cord passes by a sliding base only once, which makes a single loop, the released or retracted length of the cord would be about two times the distance that the sliding base moves. If a cord passes by a sliding base, a pin, and then the sliding base again before the cord extending out of the case, which makes two loops, the released or retracted lengths of the cord would be about 4 times the distance that the sliding base moves. And so on. Other appropriate multiples of the released/retracted lengths of the cord relative to the moving distance that the sliding base could be adjusted in other embodiments. The ratio of the diameter of the bushing 511" and the diameter of each of the drums 441 could be also adjusted depending on the multiple mentioned above and other requirements.

To change the window blind 1 from the closed state which blocks out the most light back to the open state which lets in the most light, the user can inversely manipulate the driving unit 43 of the tilting module 40 to rotate the adjusting shaft 42 in the opposite direction. Whereby the tilting unit 44 would bring the rungs of the ladder strings 41 back to the substantially horizontal position. At this time, some components of the auxiliary adjusting module 50" would operate in opposite directions, and the bushing 511" of the follower 51" would be rotated in the opposite direction along with the adjusting shaft 42. The first transmission cord 5121" would be retracted by the bushing 511" to drive the first sliding base 5211" to move right to the first position P7 of the first sliding base 5211". On the other hand, the second transmission cord 5122" would be released from the bushing 511", and therefore the second sliding base 5212" would be driven to slide left and back to the first position P8 of the second sliding base 5212". Due to the change in the overall condition of the cord adjusting member 52" (i.e., the change in the positions of the first and second sliding bases 5211" and 5212"), the movable first cords 31L and 31R and the movable second cords 32L and 32R would also change their conditions accordingly. The first sliding base 5211" would retract the first cords 31L and 31R to increase their lengths in the auxiliary adjusting module 50", whereby to retract the first cords 31L and 31R into the headrail 10 respectively through the first through holes 11L and 11R. Correspondingly, the movement of the second sliding base 5212" and the weight of the bottom rail 21 would decrease the lengths of the second cords 32L and 32R in the auxiliary adjusting module 50", whereby to release the second cords 32L and 32R out of the headrail 10 respectively through the second through holes 12L and 12R. As a result, the window blind 1 would return to the open state shown in FIGS. 2-3.

After the window blind 1 returns to the open state shown in FIGS. 2-3, if the driving unit 43 of the tilting module 40 continues to be rotated inversely, the tilting unit 44 would tilt the slats 20 again. But this time, the rungs would be tilted in a manner that their left side is higher than the right side as opposed to what is shown in FIG. 5. The ladder strings 41 would therefore tilt the slats 20 placed on the rungs and the bottom rail 21 connected to the first and second vertical portions 411 and 412 in the same manner. In other words, though not shown in the drawings, it should be understood that the slats 20 and the bottom rail 21 are tilted with their left side higher than the right side as opposed to what is shown in FIG. 5. Though the slats 20 are now turned in a different tilt direction during the process of changing the window blind 1 from the open state to the closed state, the components in the auxiliary adjusting module 50" work in the same or similar way, and some components in the auxiliary adjusting module 50" would operate in directions opposite to those shown in FIG. 20. Specifically, the adjusting shaft 42 could rotate inversely, whereby to drive the bushing 511" to rotate inversely as well. The first transmission cord 5121" would be further retracted by the bushing 511" to drive the first sliding base 5211" to slide from the first position P7 of the first sliding base 5211" in a direction away from the second position P10. The second transmission cord 5122" would be further released from the bushing 511", and therefore the second sliding base 5212" would be driven to slide from the first position P8 of the second sliding base 5212" in a direction away from the second position P9. Due to the change in the overall condition of the cord adjusting member 52" (i.e., the change in the positions of the first and second sliding bases 5211" and 5212"), the movable first cords 31L and 31R and the movable second cords 32L and 32R would also change their condition accordingly. The movement of the first sliding base 5211" would increase the lengths of the first cords 31L and 31R in the auxiliary adjusting module 50", whereby to further retract the first cords 31L and 31R into the headrail 10 respectively through the first through holes 11L and 11R. Correspondingly, the movement of the second sliding base 5212" and the weight of the bottom rail 21 would decrease the lengths of the second cords 32L and 32R in the auxiliary adjusting module 50", whereby to further release the second cords 32L and 32R out of the headrail 10 through the second through holes 12L and 12R.

With the collaboration of the aforementioned mechanisms and by making the cords 31L, 31R, 32L, and 32R of the window blind 1 all pass through the auxiliary adjusting module 50" in the aforementioned manners, the slats 20 and the bottom rail 21 could be tilted to a fully closed position along with the operation of the ladder strings 41 without being limited by the first and second cords 31L, 31R, 32L, and 32R. The slats 20 placed on the rungs of the ladder strings 41 would be turned along with the operation of the ladder strings 41 as well. Therefore, the window blind 1 could be fully closed without letting in light.

The embodiments described above are only some example embodiments of the present disclosure. All equivalent structures which employ the concepts disclosed in this specification and the appended claims should fall within the scope of the present disclosure.

What is claimed is:

1. A window blind, comprising:
- a headrail;
- a bottom rail;
- a plurality of slats provided below the headrail;
- a ladder string extending out of the headrail, wherein the ladder string comprises a first vertical portion, a second vertical portion, and a plurality of rungs for tilting the slats and the bottom rail;
- an adjusting shaft, provided in the headrail and connected to the first vertical portion and the second vertical portion for adjusting a shape of the ladder string to tilt the slats and the bottom rail;
- a first cord, extending out of the headrail and connected to a first side of the bottom rail, wherein the first cord locates at first sides of the slats;
- a second cord, extending out of the headrail and connected to a second side of the bottom rail, wherein the second cord locates at second sides of the slats; and
- an auxiliary adjusting module, provided in the headrail, connected to the adjusting shaft, and interfering with the first cord and the second cord; the auxiliary adjusting module comprising:
  - a follower, movable along with the adjusting shaft and comprising:
    - a bushing, sleeved on the adjusting shaft and rotatable along with the adjusting shaft; and
    - a transmission member, comprising a transmission cord, wherein an end of the transmission cord is fixedly connected to the bushing, and another end of the transmission cord is fixedly connected to a cord adjusting member; when the bushing rotates along with the adjusting shaft, the transmission member drives the cord adjusting member to move; and
  - the cord adjusting member being connected to the follower wherein the first cord and the second cord are movable along with the cord adjusting member; when the adjusting shaft is driven to turn the slats, the follower is driven by the adjusting shaft to move the cord adjusting member, which changes lengths of the first cord and the second cord respectively received in the headrail;

wherein when the first cord and the second cord are retracted, the slats and the bottom rail are received toward the headrail;

wherein when the first cord and the second cord are released, the slats and the bottom rail are expanded away from the headrail;

wherein when the adjusting shaft drives the slats to tilt toward a substantially vertical state in a first rotating direction, the auxiliary adjusting module releases the first cord out of the headrail and retracts the second cord into the headrail until each of the slats abuts an adjacent one of the slats;

wherein when the adjusting shaft drives the slats to turn from the substantially vertical state toward a substantially horizontal state in a second rotating direction opposite to the first rotating direction, the auxiliary adjusting module retracts the first cord into the headrail and releases the second cord out of the headrail.

2. The window blind of claim 1, wherein when the adjusting shaft tilts the slats to the substantially vertical state by releasing the first vertical portion out of the headrail and retracting the second vertical portion into the headrail, a length of the first cord released out of the headrail is greater than or equal to a length of the first vertical portion released out of the headrail, and a length of the second cord retracted into the headrail is greater than or equal to a length of the second vertical portion retracted into the headrail.

3. The window blind of claim 1, wherein, when the slats are in the substantially horizontal state, the cord adjusting member is located at a first position; when the slats are in the substantially vertical state, the cord adjusting member is located at a second position; the first position is different from the second position.

4. The window blind of claim 3, wherein, when the adjusting shaft drives the slats to turn from the substantially horizontal state to the substantially vertical state, a length of the first cord released out from the headrail or a length of the second cord retracted into the headrail is a multiple of a distance that the cord adjusting member moves from the first position to the second position.

5. The window blind of claim 3, wherein the auxiliary adjusting module further comprises a pushing member; the pushing member pushes against the cord adjusting member, and comprises an elastic member for providing an auxiliary pushing force to move the cord adjusting member toward the second position.

6. The window blind of claim 5, wherein the pushing member further comprises a swing arm and a moving member; the swing arm is pivotable relative to the cord adjusting member; the elastic member is provided between the swing arm and the moving member; an end of the moving member pushes against a force-bearing portion of the cord adjusting member; when the slats are in the substantially horizontal state, the force-bearing portion of the cord adjusting member located at the first position is closest to the swing arm, and the elastic member is compressed and has a first deformation length; when the slats are in the substantially vertical state, the force-bearing portion of the cord adjusting member located at the second position is farthest from the swing arm, and the elastic member is stretched and has a second deformation length; the second deformation length is greater than the first deformation length.

7. The window blind of claim 1, wherein the cord adjusting member comprises a sliding seat; the first cord passes by a first end of the sliding seat, and the second cord passes by a second end of the sliding seat; the first end and the second end are on opposite sides of the sliding seat in a lateral direction of the headrail.

8. The window blind of claim 7, wherein the sliding seat further comprises a first sliding base, a second sliding base, and a linking cord connected between the first sliding base and the second sliding base; the first cord passes by the first sliding base, and the second cord passes by the second sliding base.

9. The window blind of claim 1, further comprising a tilting unit; wherein the tilting unit comprises a drum fitting over the adjusting shaft; the drum rotates along with the adjusting shaft; an end of the ladder string is connected to the drum; a diameter of the bushing is greater than or equal to half of a diameter of the drum.

10. A window blind, comprising:

a headrail;

a bottom rail;

a plurality of slats provided below the headrail;

a ladder string extending out of the headrail, wherein the ladder string comprises a first vertical portion, a second vertical portion, and a plurality of rungs for tilting the slats and the bottom rail;

an adjusting shaft, provided in the headrail and connected to the first vertical portion and the second vertical portion for adjusting a shape of the ladder string to tilt the slats and the bottom rail;

a first cord, extending out of the headrail and connected to a first side of the bottom rail, wherein the first cord locates at first sides of the slats;

a second cord, extending out of the headrail and connected to a second side of the bottom rail, wherein the second cord locates at second sides of the slats; and an auxiliary adjusting module, provided in the headrail, connected to the adjusting shaft, and interfering with the first cord and the second cord, the auxiliary adjusting module comprising:

a follower, movable along with the adjusting shaft and comprising:

a bushing, sleeved on the adjusting shaft and rotatable along with the adjusting shaft; and a transmission member, comprising a first transmission cord and a second transmission cord wherein a cord adjusting member comprises a first sliding base and a second sliding base which are movable; the first transmission cord is movable along with the first sliding base, and an end of the first transmission cord is fixedly connected to the bushing; the second transmission cord is movable along with the second sliding base, and an end of the second transmission cord is fixedly connected to the bushing; the first cord passes by the first sliding base, and the second cord passes by the second sliding base; and the cord adjusting member being connected to the follower wherein the first cord and the second cord are movable along with the cord adjusting member; when the adjusting shaft is driven to turn the slats, the follower is driven by the adjusting shaft to move the cord adjusting member, which changes lengths of the first cord and the second cord respectively received in the headrail;

wherein when the first cord and the second cord are retracted, the slats and the bottom rail are received toward the headrail;

wherein when the first cord and the second cord are released, the slats and the bottom rail are expanded away from the headrail;

wherein when the adjusting shaft drives the slats to tilt toward a substantially vertical state in a first rotating direction, the auxiliary adjusting module releases the first cord out of the headrail and retracts the second cord into the headrail until each of the slats abuts an adjacent one of the slats;

wherein when the adjusting shaft drives the slats to turn from the substantially vertical state toward a substantially horizontal state in a second rotating direction opposite to the first rotating direction, the auxiliary adjusting module retracts the first cord into the headrail and releases the second cord out of the headrail.

11. The window blind of claim 10, further comprising two tilting units, wherein the auxiliary adjusting module is located between the tilting units; the auxiliary adjusting module further comprises a first direction-changing member provided corresponding to the first sliding base, and a second direction-changing member provided corresponding to the second sliding base; the first cord contacts and veers at the first direction-changing member and passes by the first sliding base; the second cord contacts and veers at the second direction-changing member and passes by the second sliding base.

* * * * *